(12) United States Patent
Surineni et al.

(10) Patent No.: US 7,796,545 B2
(45) Date of Patent: Sep. 14, 2010

(54) METHOD AND APPARATUS FOR SCHEDULING IN A WIRELESS COMMUNICATION NETWORK

(75) Inventors: Shravan K. Surineni, Marlborough, MA (US); Arnaud Meylan, San Diego, CA (US); Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1209 days.

(21) Appl. No.: 11/388,573

(22) Filed: Mar. 24, 2006

(65) Prior Publication Data

US 2007/0161364 A1 Jul. 12, 2007

Related U.S. Application Data

(60) Provisional application No. 60/759,730, filed on Jan. 18, 2006, provisional application No. 60/758,076, filed on Jan. 10, 2006.

(51) Int. Cl.
*H04L 12/56* (2006.01)
*H04B 7/212* (2006.01)

(52) U.S. Cl. .................. 370/278; 370/252; 370/254; 370/337; 370/442

(58) Field of Classification Search ................ 370/254, 370/252, 278, 282, 328, 329, 336, 337, 442, 370/445
See application file for complete search history.

(56) References Cited

U.S. PATENT DOCUMENTS

| | | | |
|---|---|---|---|
| 7,626,966 B1 * | 12/2009 | Ruiter et al. | 370/337 |
| 2005/0226273 A1 | 10/2005 | Qian | |
| 2006/0164969 A1 * | 7/2006 | Malik et al. | 370/203 |
| 2008/0019329 A1 * | 1/2008 | Benveniste | 370/337 |

FOREIGN PATENT DOCUMENTS

| | | |
|---|---|---|
| EP | 1296484 A1 | 3/2003 |
| EP | 1589702 A1 | 4/2005 |

(Continued)

OTHER PUBLICATIONS

EWC: HT MAC Specification ;Enhanced Wireless Consortium publication Version V1.24 pp. 100.

(Continued)

*Primary Examiner*—John Pezzlo
(74) *Attorney, Agent, or Firm*—Dmitry R. Milikovsky; Andrea L. Mays

(57) ABSTRACT

Techniques to efficiently schedule and serve stations in a wireless network are described. An access point may aggregate stations with flows carrying traffic having similar characteristics, e.g., VoIP flows. The access point may schedule these stations together in an overall service period. The access point may serve each station in a respective service period within the overall service period. The access point may send a multi poll frame at the start of the overall service period to indicate the start time and/or service period for each station. Each station may decide to power down until its start time. The service periods for the stations may overlap one another. The service period for each station may cover an initial transmission as well as additional transmission and/or retransmission. If additional transmission and/or retransmission are not needed for a given station, then the next station may be served right away.

45 Claims, 19 Drawing Sheets

FOREIGN PATENT DOCUMENTS

WO            9913600 A1     3/1999

OTHER PUBLICATIONS

A Peek ahead at 802.11n:MIMO-OFDM Chapter 15 pp. 311-342.

Diepstraten, et al., "802.11 MAC Entity: MAC Basic Access Mechanism Privacy and Access Control," doc: IEEE P802.11-96/49C, Mar. 1996, pp. 1-22.

Gast, "802.11 Wireless Networks: The Definitive Guide, Second Edition," Apr. 2005, ISBN 10: 0-596-100052-3, ISBN 13: 9780596100520, p. 330.

Mangold, et al., "Analysis of IEEE 802.11E for QOS Support in Wireless LANS," IEEE Wireless Communications, Piscataway, NJ, vol. 10, Issue 6, Dec. 2003, pp. 40-50.

Ni, et al., "A Survey of QoS Enhancements for IEEE 802.11 Wireless LAN," Wireless Communications and Mobile Computing, Wiley, Chichester, GB, Aug. 1, 2004, pp. 1-22.

Ziouva, et al., "Improved IEEE 802.11 PCF Performance Using Silence Detection and Cyclic Shift on Stations Polling," IEE Proceedings: Communications, Institution of Electrical Engineers, GB, vol. 150, No. 1, Feb. 13, 2003, pp. 45-51.

International Search Report—PCT/US07/060336, International Search Authority—European Patent Office, May 10, 2007.

Written Opinion—PCT/US07/060336, International Search Authority—European Patent Office, May 10, 2007.

International Preliminary Report on Patentability—PCT/US07/060336, International Bureau of WIPO—Geneva, Switzerland, Jul. 15, 2008.

European Search Report—EP08014213, Search Authority—The Hague, Oct. 6, 2008.

European Search Opinion—EP08014213, Search Authority—The Hague. Oct. 6, 2008.

European Search Report—EP08014214, Search Authority—The Hague, Oct. 6, 2008.

European Search Opinion—EP08014214, Search Authority—The Hague, Oct. 6, 2008.

\* cited by examiner

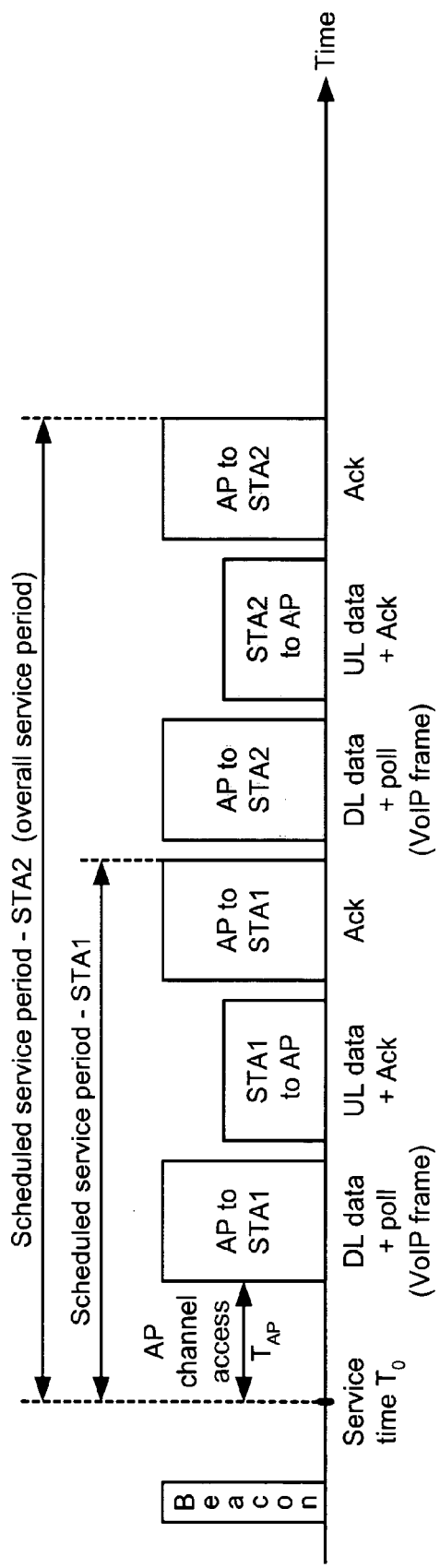
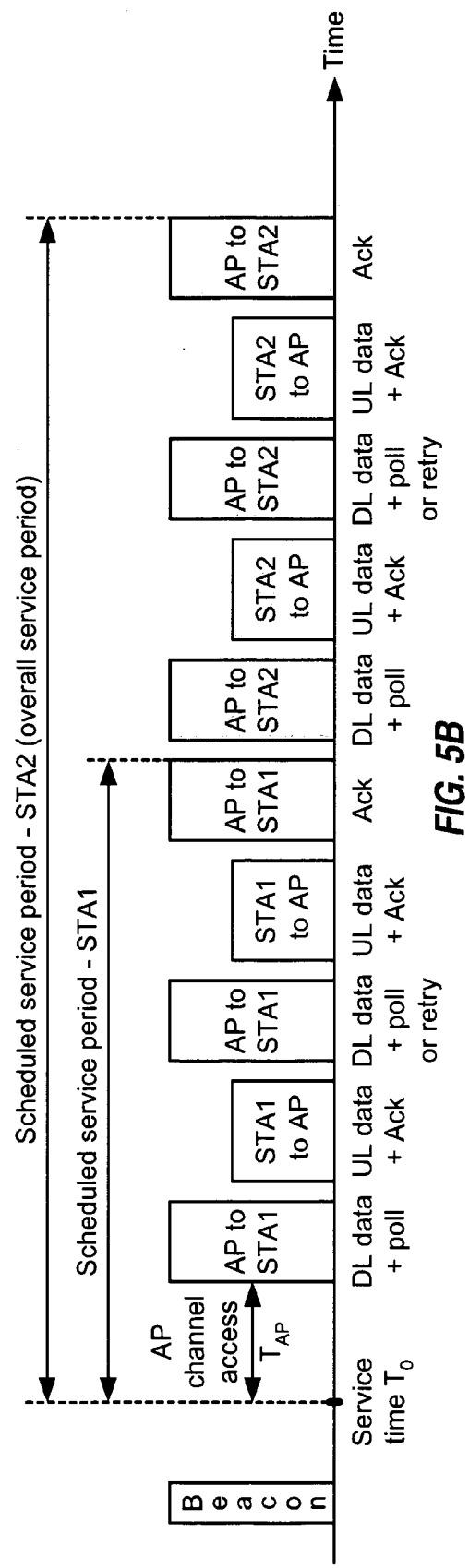
FIG. 5A
FIG. 5B

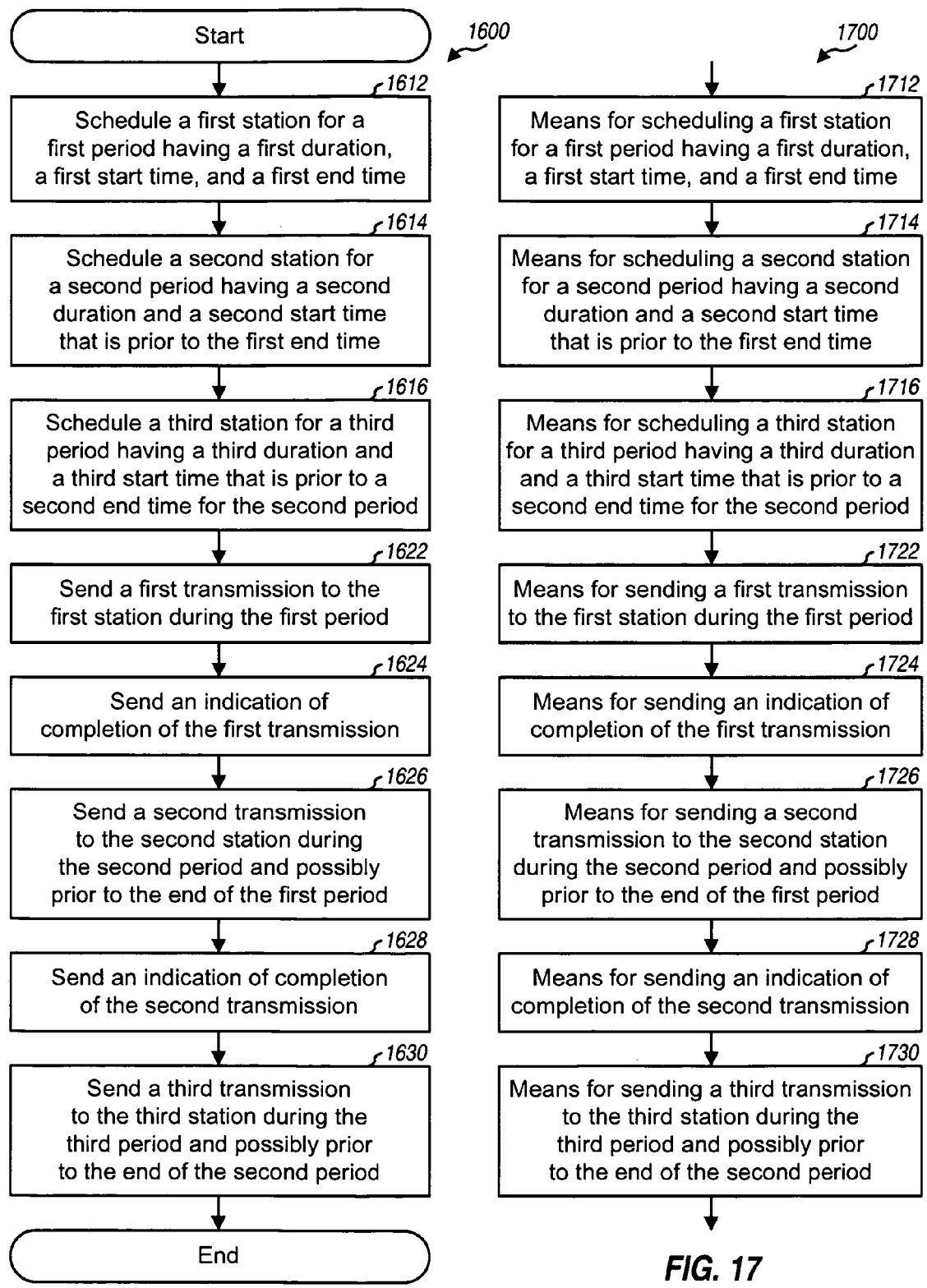

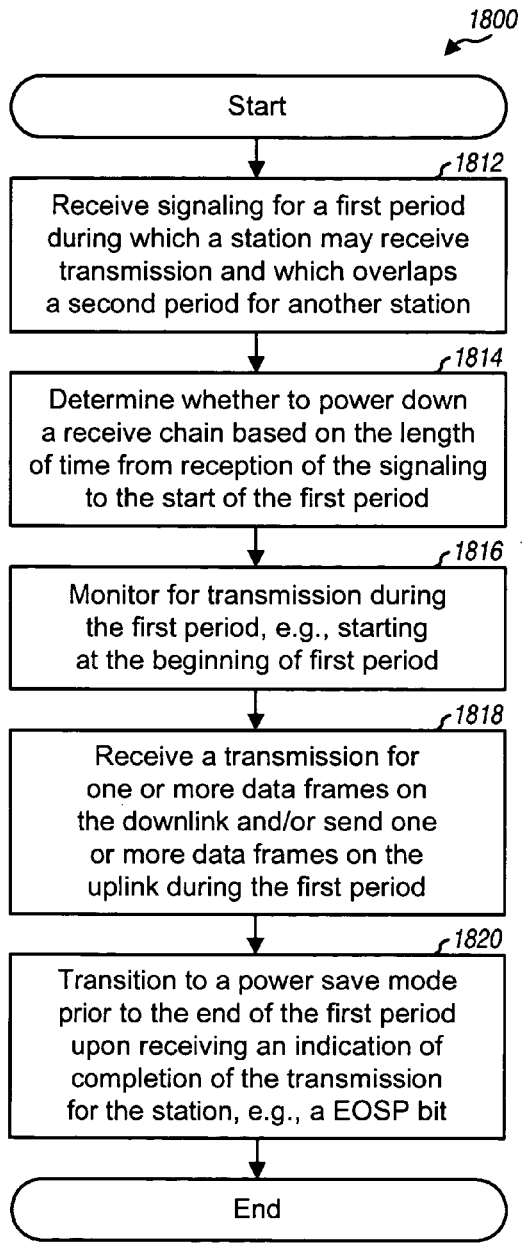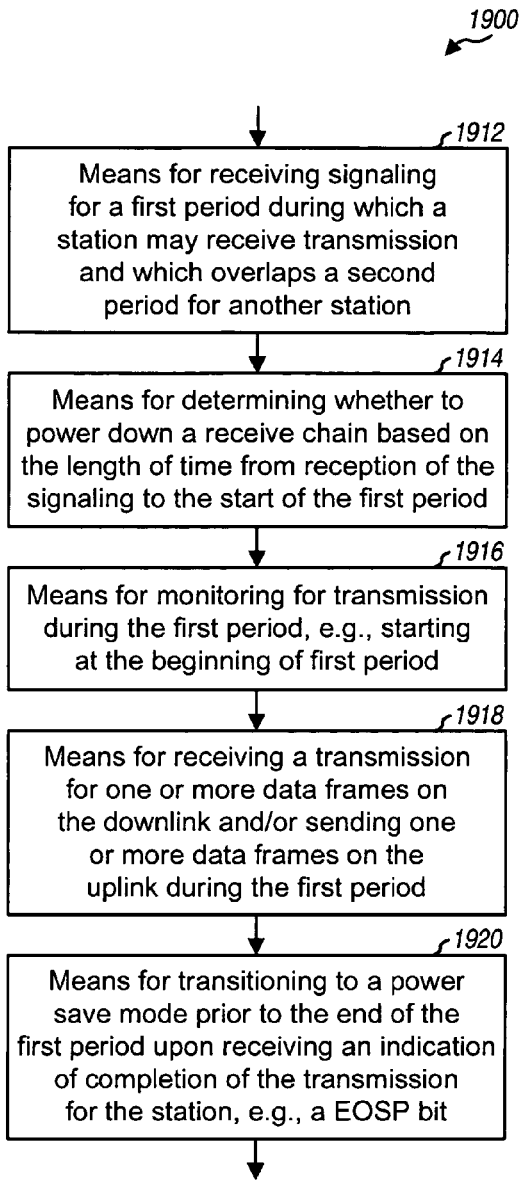
FIG. 18
FIG. 19

METHOD AND APPARATUS FOR SCHEDULING IN A WIRELESS COMMUNICATION NETWORK

CLAIM OF PRIORITY UNDER 35 U.S.C. §119

The present Application for Patent claims priority to Provisional Application No. 60/758,076 entitled "WLAN AP SCHEDULER FOR MAXIMIZING POWER SAVE WITH S-APSD CLIENTS" filed Jan. 10, 2006, and Provisional Application No. 60/759,730 entitled "WLAN AP SCHEDULER FOR MAXIMIZING POWER SAVE WITH S-APSD CLIENTS (HANDSETS)" filed Jan. 18, 2006, and assigned to the assignee hereof and hereby expressly incorporated by reference herein.

BACKGROUND

I. Field

The present disclosure relates generally to communication, and more specifically to techniques for scheduling transmissions and saving power for stations in a wireless communication network.

II. Background

Wireless networks are widely deployed to provide various communication services such as voice, video, packet data, and so on. These networks may be capable of supporting communication for multiple users by sharing the available network resources. Examples of such networks include wireless local area networks (WLANs), wireless personal area networks (WPANs), and wireless wide area networks (WWANs). The terms "network" and "system" are often used interchangeably.

A wireless network may include any number of access points and any number of terminals. An access point may act as a coordinator for communication with the terminals. A terminal may actively communicate with an access point, may be idle, or may be powered down at any given moment. The terminals may have different data requirements and capabilities. A major challenge is then to schedule terminals for transmission as efficiently as possible based on their requirements and capabilities and the available network resources.

There is therefore a need in the art for techniques to efficiently schedule terminals in a wireless network.

SUMMARY

Techniques to efficiently schedule and serve stations in a wireless network are described herein. The stations may be terminals and/or access points. In an aspect, an access point aggregates stations with flows carrying traffic having similar characteristics, e.g., voice over Internet Protocol (VoIP) flows. The access point schedules these stations together in an overall service period. The access point serves each station in a respective service period within the overall service period. The aggregation, scheduling, and servicing of the stations are described in detail below.

In another aspect, power save multi poll (PSMP) is used in combination with aggregation. The access point may send a PSMP frame at the start of the overall service period. The PSMP frame may indicate the start time and/or service period for each station scheduled in the overall service period. Each station receives the PSMP frame and may decide to power down until its start time.

In yet another aspect, the stations are scheduled such that their service periods overlap one another. The scheduled service period for each station may cover an initial transmission for the station as well as additional transmission and/or retransmission. The scheduled service period for a second station that is served second may overlap the additional and retransmission portion of the service period for a first station that is served first. If additional transmission and/or retransmission are not needed for the first station, then the second station may be served at the start of its scheduled service period, which is right after the initial transmission for the first station.

In yet another aspect, the access point blocks off designated periods of time for scheduled operation and informs the stations within its coverage area of these designated periods. The access point may then transmit at the start of a designated period without performing channel access.

The various aspects and embodiments of the disclosure are described in detail below.

BRIEF DESCRIPTION OF THE DRAWINGS

The features and nature of the present disclosure will become more apparent from the detailed description set forth below when taken in conjunction with the drawings in which like reference characters identify correspondingly throughout.

FIGS. 5A and 5B show scheduled operation with aggregation.

FIG. 16 shows a process to schedule with staggering and overlapping.

FIG. 17 shows an apparatus to schedule with staggering and overlapping.

FIG. 18 shows a process to operate a station.

FIG. 19 shows an apparatus for a station.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The scheduling techniques described herein may be used for various wireless networks such as WLANs, WPANs, WWANs, and so on. These techniques may also be used for (1) a time division duplexed (TDD) network in which data is sent on the downlink and uplink on a single frequency band in different time intervals and (2) a frequency division duplexed (FDD) network in which data is sent on the downlink and uplink on separate frequency bands. For clarity, the scheduling techniques are described below for a TDD WLAN.

Figure 1:
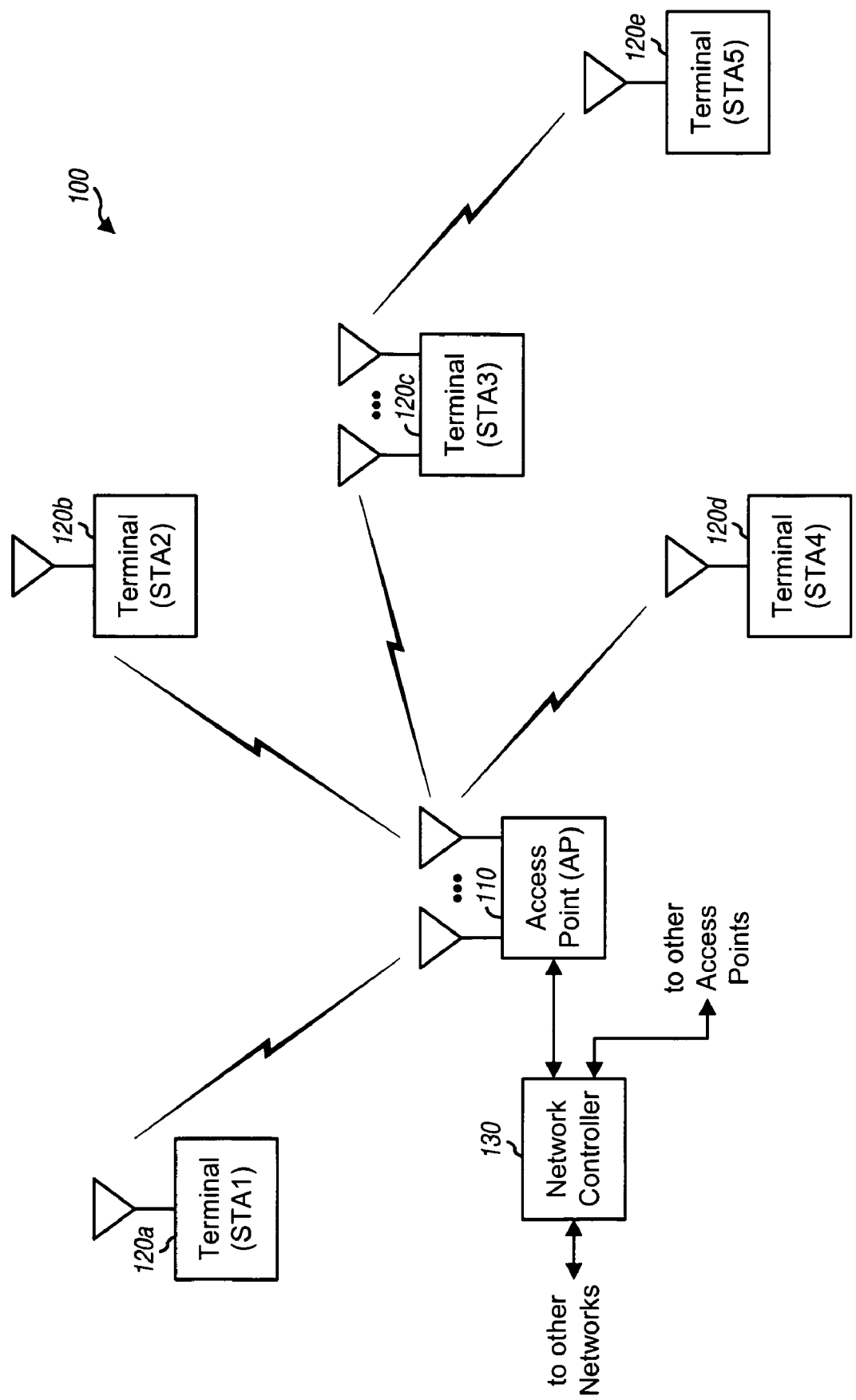
FIG. 1 shows a wireless network with an access point and multiple terminals.

FIG. 1 shows a wireless network 100 with an access point 110 and multiple terminals 120a through 120e. In general, a wireless network may include any number of access points and any number of terminals. An access point is a station that provides access to distribution services via a wireless medium for associated stations. The terms "wireless medium" and "channel" are used interchangeably herein. An access point may also be called, and may contain some or all of the functionality of, a base station, a base transceiver subsystem (BTS), a Node B, and/or some other network entity. A terminal is a station that can communicate with another station via the wireless medium. A terminal may communicate with an access point or peer-to-peer with another terminal. A terminal may also be called, and may contain some or all of the functionality of, an access terminal, a user terminal, a mobile station, a user equipment (UE), and/or some other entity. A terminal may be a cellular phone, a handheld device, a wireless device, a personal digital assistant (PDA), a laptop computer, a wireless modem card, a cordless phone, and so on.

For a centralized network, a network controller 130 couples to the access points and provides coordination and control for these access points. Network controller 130 may be a single network entity or a collection of network entities. For a distributed network, the access points may communicate with one another as needed without the uses of network controller 130.

Wireless network 100 may implement the IEEE 802.11 family of standards adopted by The Institute of Electrical and Electronics Engineers (IEEE). For example, wireless network 100 may implement IEEE 802.11, 802.11a, 802.11b, 802.11e and/or 802.11g, which are existing IEEE 802.11 standards. Wireless network 100 may also implement IEEE 802.11n and/or 802.11s, which are IEEE 802.11 standards being formed. IEEE 802.11, 802.11a, 802.1b, 802.11g, and 802.1 in cover different radio technologies and have different capabilities. IEEE 802.11e covers quality of service (QoS) enhancements for a medium access control (MAC) layer. In IEEE 802.11e, a station that supports QoS facility is referred to as QSTA, and an access point that supports QoS facility is referred to as QAP. QoS facility refers to mechanisms used to provide parameterized and prioritized QoS.

A station (STA) may communicate with an access point (AP) for one or more flows. A flow is a higher layer (e.g., TCP or UDP) data stream that is sent via a link. A flow may also be referred to as a data stream, a traffic stream, and so on. A flow may carry any type of data such as, e.g., voice, video, packet data, and so on. A flow may be for a particular traffic class and may have certain requirements on data rate, latency or delay, and so on. A flow may be periodic or non-periodic. A non-periodic flow is a flow in which data is sent sporadically, e.g., whenever there is data to send. A periodic flow is a flow in which data is sent at regular interval. For example, a flow for VoIP may send a data frame every 10 or 20 milliseconds (ms). As used herein, a frame may be a data frame, a null frame, a control frame, or some other type of frame. A frame may also be referred to as a packet, a data block, a data unit, a protocol data unit (PDU), a service data unit (SDU), a MAC PDU (MPDU), and so on. A call for a STA may have any one or more flows for one or more traffic types.

Figure 2:
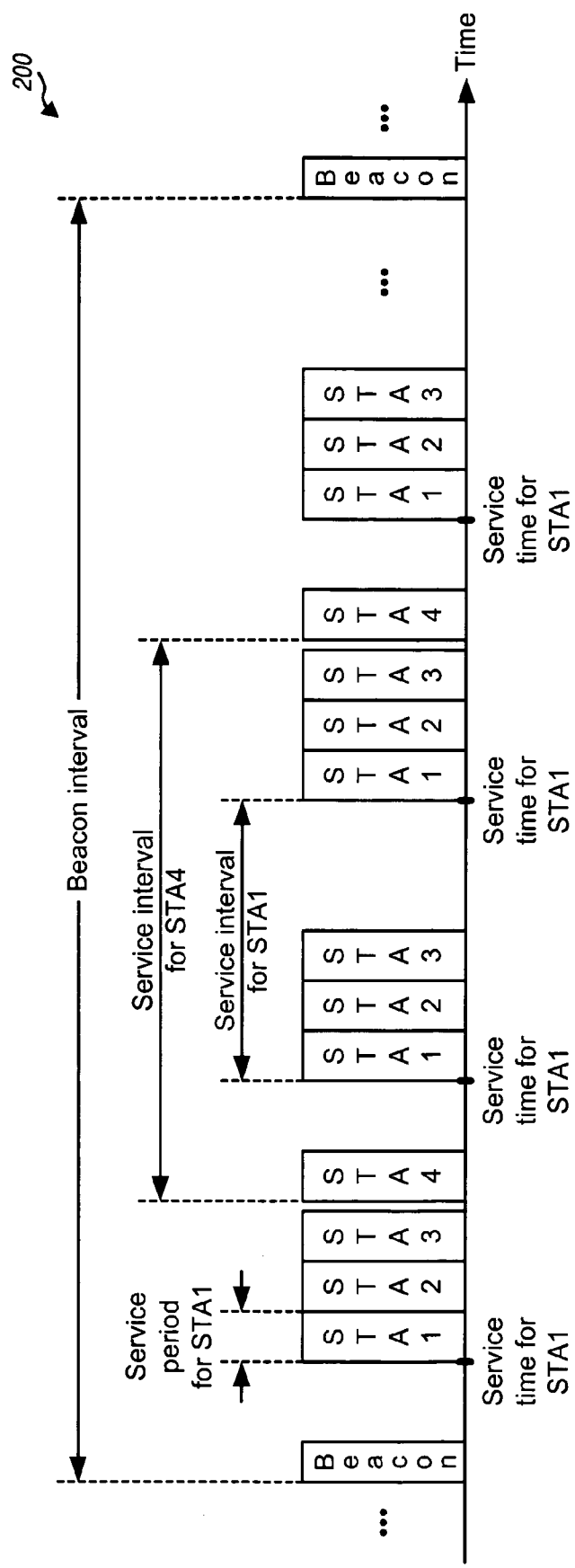
FIG. 2 shows a transmission timeline for the access point.

FIG. 2 shows an exemplary transmission timeline 200 for AP 110 in wireless network 100. In general, each AP in a wireless network maintains a separate timeline for all transmissions covered by that AP. The transmission timeline for AP 110 is described below. AP 110 periodically transmits a beacon on the downlink. This beacon carries a preamble and an AP identifier (AP ID) that allows the STAs to detect and identify the AP. The time interval between the start of two consecutive beacons is called a target beacon transmit time (TBTT) or a beacon interval. The beacon interval may be fixed or variable and may be set to a suitable duration, e.g., 100 ms.

A beacon interval may include any number of service periods for any number of STAs. A service period is a contiguous time duration during which an AP may transmit one or more downlink frames to a STA and/or may grant one or more transmission opportunities (TXOPs) to the same STA. A TXOP is an allocation of time for transmission on a link. A service period may be scheduled or unscheduled. A given STA may have any number of service periods within a beacon interval.

A service interval is the time interval between the start of two successive service periods for a given STA. The service interval for a periodic flow may be set based on the periodicity of the traffic being sent in that flow, e.g., 10 or 20 ms for VoIP or some other value based on latency requirements. As shown in FIG. 2, different STAs may have different service intervals. A service time is the start of a service period. The service times for a given STA are a series of time instances that are separated by the service interval for that STA.

IEEE 802.11e defines two Automatic Power Save Delivery (APSD) modes that are referred to as unscheduled APSD (U-APSD) and scheduled APSD (S-APSD). Unscheduled APSD requires no centralized coordination. In this mode, each STA may independently choose its service times. Scheduled APSD utilizes centralized scheduling of service times by an AP.

Figure 3:
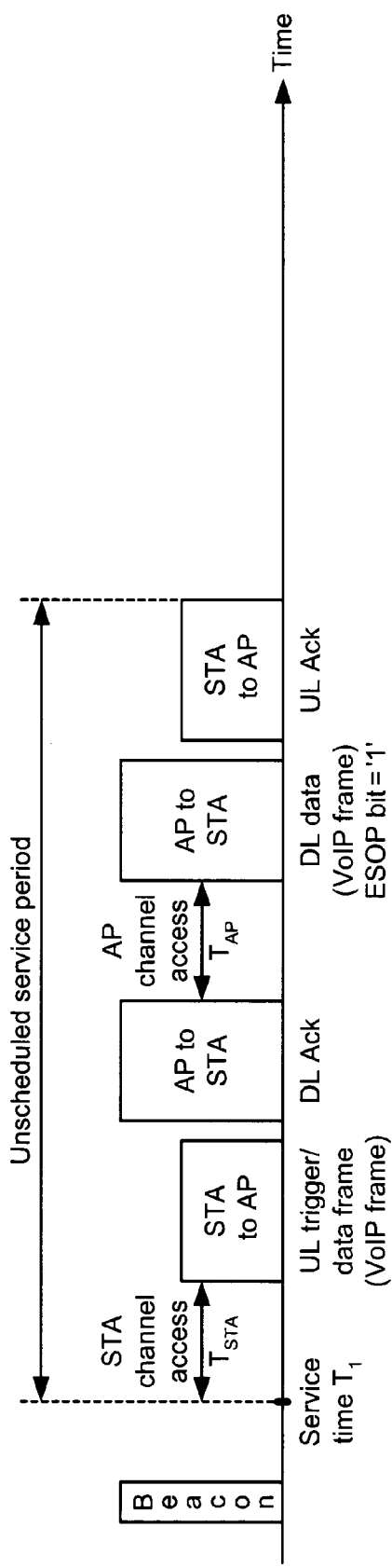
FIG. 3 shows unscheduled operation.

FIG. 3 shows unscheduled APSD operation for one STA. The STA selects a service time of $T_1$. At service time $T_1$, the STA performs an enhanced distributed channel access (EDCA) procedure defined by IEEE 802.11 to access the wireless medium. The channel access may take a variable amount of time $T_{STA}$, which is dependent on whether the channel is busy and on the EDCA Access Category (AC) used. Upon gaining access to the channel, the STA transmits a trigger frame on the uplink (UL). This trigger frame may be a data frame (e.g., a VoIP frame), a QoS Null frame, or some other frame with an indication that it is a trigger frame. The frame formats for various types of frames are described in IEEE 802.11 documents.

The AP may send an acknowledgement (Ack) on the downlink (DL) in response to receiving the trigger/data frame from the STA. In general, the AP may send an acknowledgment for a single data frame or a block acknowledgment for multiple data frames. Hence, an "Ack" may be a single acknowledgment or any type of block acknowledgment. The AP may send data to the STA along with the Ack, which is not shown in FIG. 3. The response (Ack or Data) is used by the STA to confirm the start of the service period. The STA stays awake in the service period until it is terminated by the AP or a beacon is received. If the AP does not have the downlink data ready then, after sending the Ack to confirm reception of the trigger and the start of the service period, the AP may retrieve the data, perform channel access, and transmit data to the STA in a subsequent downlink data frame, as shown in FIG. 3. The STA may then send an Ack for the downlink data frame. The AP may transmit a frame with an end-of-service-period (EOSP) bit set to '1' to indicate the end of the service period for the STA, as shown in FIG. 3. The STA remains awake until the end of the unscheduled service period and acknowledges any data frame sent by the AP. In the example shown in FIG. 3, for the unscheduled service period, the STA is in a transmit state for a duration of two frames (one trigger/data frame and one Ack frame) and is in a receive state for a duration of $T_{STA}$ plus $T_{AP}$ plus two frames (one Ack frame and one data frame). For simplicity, FIG. 3 shows all downlink frames having equal duration and all uplink frames also having equal duration. In general, the frames may have different durations, with the duration of each frame being dependent on the amount of data being sent and the rate used for the frame.

Figure 4:
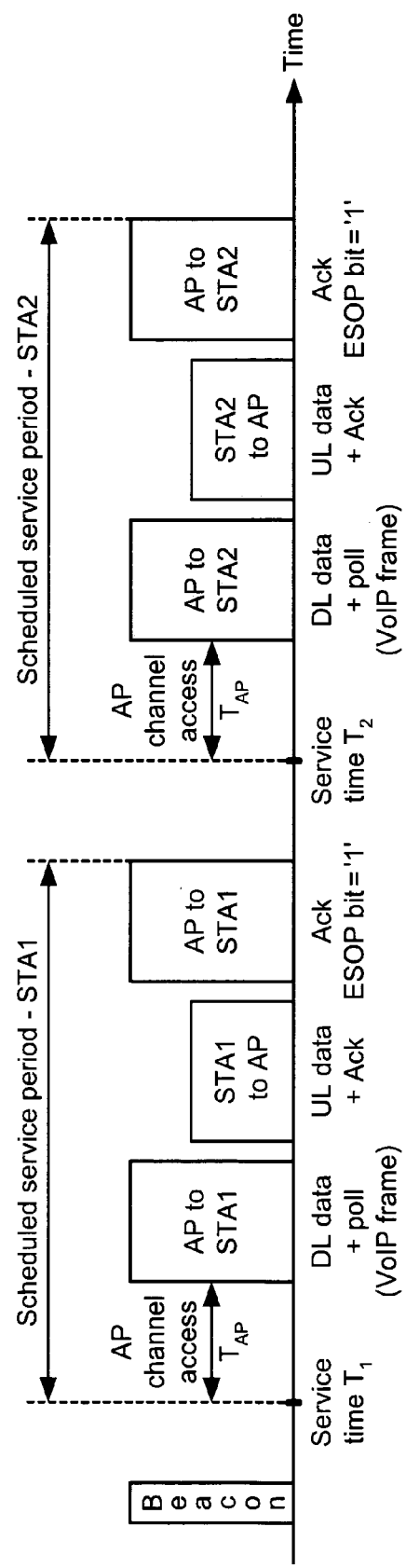
FIG. 4 shows scheduled operation with individual service times.

FIG. 4 shows scheduled APSD operation for two STAs with disjoint service times. The AP schedules a service time of $T_1$ for STA1 and a service time of $T_2$ for STA2. At service time $T_1$, the AP accesses the wireless medium and transmits a downlink data frame (e.g., a VoIP frame) to STA1. The downlink data frame may include a poll that queries STA1 for any data to send and grants a TXOP for transmission of the uplink. STA1 sends an Ack for the downlink data frame and may send data to the AP along with the Ack. The AP would then send an Ack for the uplink data frame from STA1. The service period ends when the AP transmits a frame with the EOSP bit set to '1', as shown in FIG. 4. The AP repeats the transmission procedure for STA2 at service time $T_2$.

The AP may estimate the duration of a service period for a STA based on various types of information. The rate at which data may be reliably exchanged between the AP and the STA may be estimated based on pilot and/or other transmissions. The amount of data to exchange may be known a priori for some applications (e.g., VoIP) or may be predicted. The service period duration may be computed based on the rate and the amount of data to exchange. The service period duration may also be determined based on the desired packet error rate and/or other factors.

Scheduled APSD may provide certain efficiencies over unscheduled APSD. For scheduled APSD, the AP may transfer data frames for the scheduled STAs into transmit buffers and have these data frames ready for transmission at the service times. In contrast, the service periods in unscheduled APSD are unpredictable for the AP since the timing and order of the trigger frames from the STAs are unpredictable. Hence, buffer management is more complicated in unscheduled APSD. The AP may not have the data ready in SIFS time and may need to retrieve the data, perform channel access, and send the data to the STA, as shown in FIG. 3. In all cases, the AP responds to a trigger frame within a SIFS (Short Inter-FrameSpacing), which is equal to 16 microsecond (μs) in IEEE 802.11a/g and 10 μs in IEEE 802.11b.

The AP may schedule a series of service times for any number of STAs with scheduled APSD. The service times for each STA may be spaced apart by the service interval for that STA, as shown in FIG. 2. The AP may perform the transmission procedure for each STA at the service time for that STA. For the scheme shown in FIG. 4, the AP performs channel access for each STA. Multiple channel accesses for multiple STAs result in a waste of time that might be used for transmission. Furthermore, the channel may become congested during the time from the end of one scheduled service period to the start of the next scheduled service period, which may then delay service for one or more STAs.

A STA may implement power save (or "sleep") features that can power down (1) all or parts of a transmit chain during periods when the STA is not transmitting and/or (2) all or parts of a receive chain during periods when the STA is not receiving. The power save features are especially applicable for periodic flows, such as VoIP, but may also be used for non-periodic flows. The power save features are beneficial to handheld and battery-operated devices (e.g., cellular phones) for reducing power consumption and extending operating life between battery recharges.

The scheduling techniques described herein support power save features for STAs. The techniques may be used for periodic and non-periodic flows. The techniques may also be used for various wireless networks and standards. For clarity, the techniques are described below for VoIP flows with scheduled APSD in IEEE 802.11e.

In an aspect, the AP aggregates STAs with flows having similar characteristics and schedules these STAs together. Various types of traffic may be defined such as, e.g., voice, video, packet data, and so on. Each traffic type may be associated with certain characteristics and requirements such as minimum data rate, latency or delay, and so on. For example, voice may be associated with periodic transmission and relatively stringent delay requirements. The AP may aggregate STAs with flows of the same traffic type, e.g., VoIP. The AP may establish a series of common service times for these STAs. The aggregation of flows may simplify scheduling and buffer management and may provide other benefits.

FIG. 5A shows an embodiment of scheduled APSD operation with aggregation for two STAs. The AP schedules a common service time of $T_0$ and an overall/aggregate service period for both STA1 and STA2. At service time $T_0$, the AP accesses the wireless medium and transmits a downlink data frame (e.g., a VoIP frame) to STA1. STA1 sends an Ack for the downlink data frame and may send data to the AP along with the Ack either in response to a poll from the AP or after performing the channel access procedure. The AP would then send an Ack for the uplink data frame from STA1. The AP should set the EOSP bit to '1' in the downlink Ack frame to indicate that the service period for STA1 has ended. STA1 may transition to the power save mode upon detecting the EOSP bit being set.

The AP may then transmit a downlink data frame to STA2. STA2 sends an Ack for the downlink data frame and may send data to the AP along with the Ack. The AP would then send an Ack for the uplink data frame from STA2. The AP may set the EOSP bit in the downlink Ack frame to indicate that the service period for STA2 has ended. STA2 may transition to the power save mode upon detecting the EOSP bit being set.

FIG. 5B shows an embodiment of scheduled APSD operation with aggregation and multi-frame transmissions for two STAs. The AP schedules a common service time of $T_0$ and an overall service period for both STA1 and STA2. At service time $T_0$, the AP accesses the wireless medium and transmits a first downlink data frame to STA1. STA1 may transmit an Ack for the first downlink data frame as well as uplink data. The AP may transmit a second downlink data frame or may retransmit the first downlink data frame to STA1. STA1 may send an Ack for the first or second downlink data frame as well as uplink data. The AP may send an Ack for the uplink data frame from STA1. The AP may also set the EOSP bit in the downlink Ack frame to indicate that the service period for STA1 has ended. STA1 may transition to the power save mode upon detecting the EOSP bit being set. The AP may then transmit to STA2 in similar manner.

The AP may serve the aggregated STAs in various manners. In one embodiment, which is shown in FIGS. 5A and 5B, the AP serves the STAs in a round robin manner, one STA at a time, and completely serves a STA before serving the next STA. The AP may serve STA1, then STA2, and so on. In this embodiment, the service period for each STA may be selected to be sufficiently long to accommodate transmission to and from the STA as well as possible retransmission for data frames received in error. The transmission and retransmission, if any, for one STA are completed before starting the transmission for another STA.

In another embodiment, the AP cycles through the STAs for initial transmission and may cycle through the STAs for additional transmission and/or retransmission. The initial transmission for each STA may include a downlink data frame from the AP, an uplink data frame from the STA, and an Ack for the uplink data frame. Retransmissions for the STAs may follow the initial transmissions for all of the STAs. In this embodiment, the overall service period may be selected to be sufficiently long to accommodate transmissions to and from all STAs plus additional time for retransmissions.

In both embodiments described above, a STA may transmit a single uplink data frame in each service period with an assumption that previous uplink data frames were successfully sent. The STA may piggyback an Ack for a previous downlink data frame with the current uplink data frame (e.g., a QoS data+CF-Ack frame), as shown in FIGS. 5A and 5B.

For scheduled APSD with aggregation, the AP performs a single channel access for all STAs that are aggregated together. This reduces overhead for channel access and further avoids the scenario in which the channel becomes congested between the scheduled service periods for the STAs.

For scheduled APSD with aggregation, a schedule for the STAs may be conveyed in various manners. In one embodiment, the schedule for the STAs is conveyed in the beacon. In this embodiment, the schedule may be updated in each beacon interval. In another embodiment, the schedule for a flow is determined when the flow is established and is conveyed at that time. The schedule may be modified as necessary and conveyed, e.g., in a frame sent during a service period.

For scheduled APSD with aggregation shown in FIGS. 5A and 5B, a STA remains awake starting at the common service time $T_0$. The STA may enter the power save mode prior to the expiry of its service period if the STA is able to complete transmission and reception of its frames or has completed the permitted frame exchange based on some rule. The STA may also enter the power save mode upon receiving a frame with the EOSP bit set or upon expiry of its scheduled service period.

For scheduled APSD with aggregation, the amount of time a STA remains awake is determined by its own scheduled service period, which is dependent on the order in which the AP serves the STAs in the overall service period. In FIG. 5A, each STA is in a transmit state for a duration of one frame (one data frame with Ack) and is in a receive state for a duration of $T_{AP}$ plus two frames (one data frame and one Ack frame) plus a wait time. $T_{AP}$ is the amount of time for the AP to gain access to the wireless medium and may be variable due to impending transmissions in the channel. The wait time includes the service periods for all STAs that are served earlier and is approximately 50% of the overall service period, on average, if the AP serves the STAs in a round robin manner. Hence, a STA that is served earlier has a shorter awake period whereas a STA that is served later has a longer awake period. A STA may sleep as soon as it receives a downlink frame with the EOSP bit set or its scheduled service period expires.

In another aspect, power save multi poll (PSMP) is used in combination with scheduled APSD and aggregation in order to reduce the amount of time each STA remains awake and to provide scheduling flexibility. PSMP is a multi poll technique that allows for efficient operation with scheduled APSD and aggregation. The AP selects a common service time of $T_0$ for all STAs to be aggregated. The AP sends a PSMP frame, which may also be called a multi poll frame, at the common service time. The PSMP frame indicates the start time for each of the STAs that are scheduled in the current overall service period. Each STA receives the PSMP frame and may decide to power down all or parts of its receive chain until its start time based on the schedule indicated in the PSMP. This decision may be dependent on various factors such as the available battery power at the STA, the amount of time until the start time, and so on. PSMP allows a STA to receive its transmission without necessarily having to stay awake during the service periods for earlier STAs. This may improve power savings for some STAs.

Figure 6A:
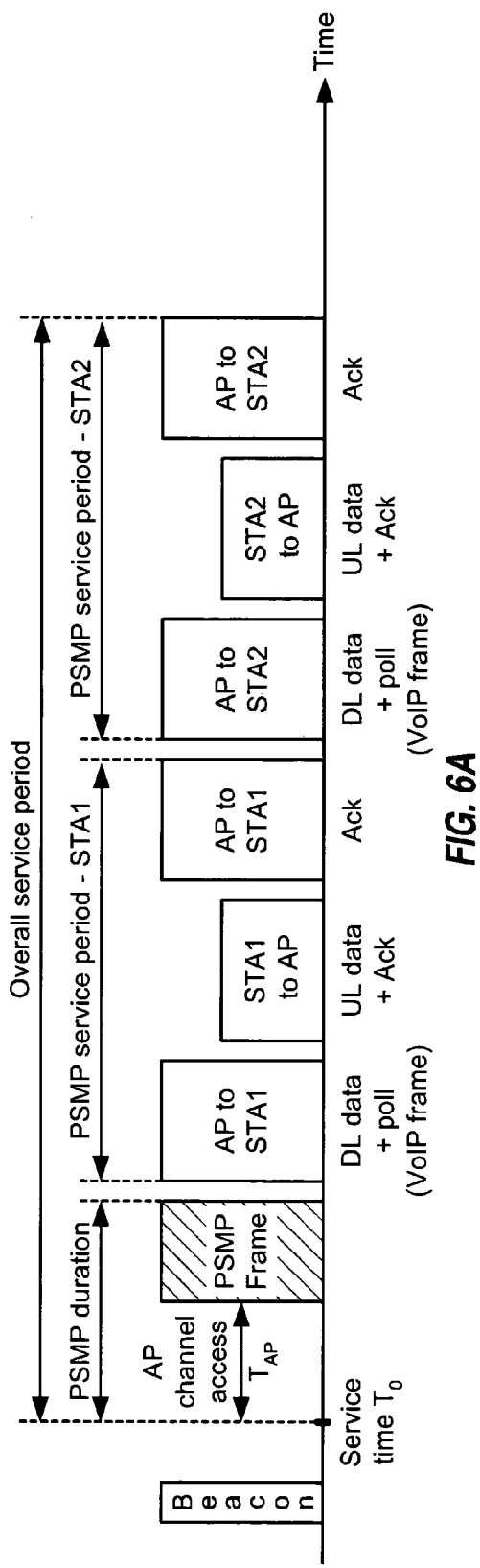
FIGS. 6A and 6B show scheduled operation with aggregation and PSMP.

FIG. 6A shows an embodiment of scheduled APSD operation with PSMP for two STAs. The AP schedules a common service time of $T_0$ for both STA1 and STA2. At service time $T_0$, the AP accesses the wireless medium and transmits a PSMP frame to the STAs. The PSMP frame indicates that STA1 is served first followed by STA2. STA2 may decide to enter the power save state until its start time. The AP transmits a downlink data frame (e.g., a VoIP frame) to STA1. STA1 sends an Ack for the downlink data frame and may send data along with the Ack. The AP would then send an Ack for the uplink data frame and may set the EOSP bit in the downlink Ack frame. STA1 may enter the power save mode upon detecting the EOSP bit being set or at the expiry of its service period. The AP may then transmit to STA2 in similar manner.

Figure 6B:
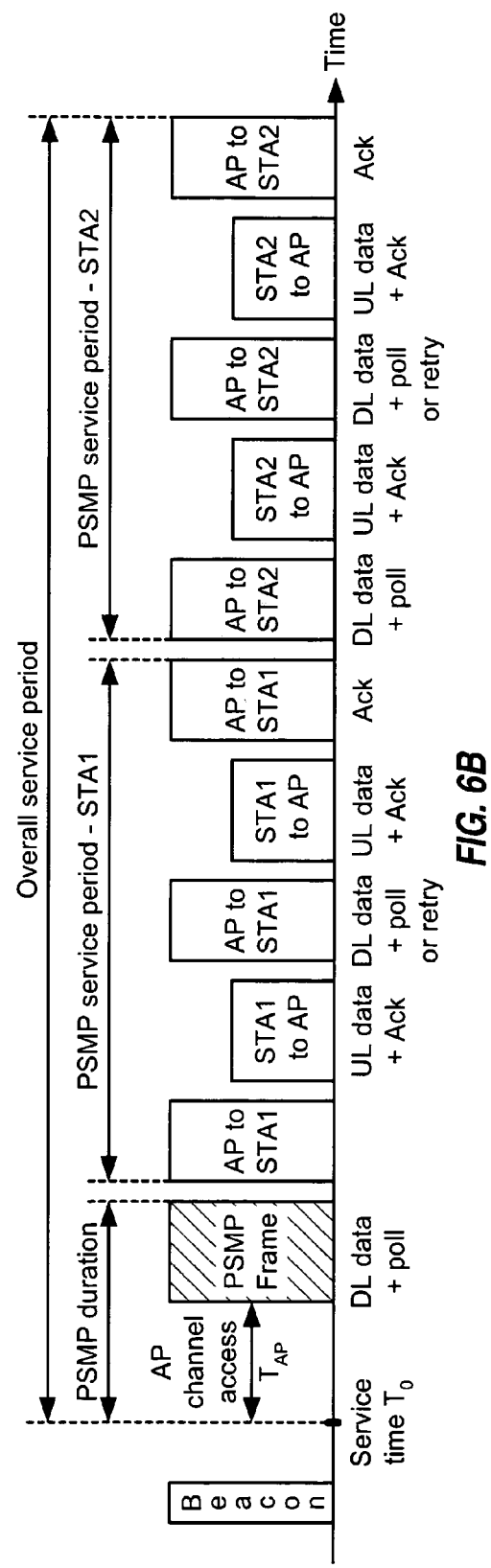

FIG. 6B shows an embodiment of scheduled APSD operation with PSMP and multi-frame transmissions for two STAs. In the embodiment shown in FIG. 6B, the service period for each STA covers two downlink data frames, two uplink data frames, and an Ack frame, or a total of five frames. The second downlink and uplink data frames may carry additional data or retransmissions of the first downlink and uplink data frames, respectively. The AP serves STA1 and STA2 in the manner described above for FIGS. 5B and 6A.

For scheduled APSD with aggregation and PSMP, the service period for each STA includes the PSMP duration as well as the transmissions for that STA. The service period for each STA is a fraction of the overall service period for all of the STAs. In the embodiment shown in FIG. 6A, each STA is in the transmit state for a duration of one frame (1 data frame with Ack) and is in the receive state for a duration of $T_{AP}$ plus three frames (1 PSMP frame, 1 data frame, and 1 Ack frame). A STA that is served later (e.g., STA2 in FIGS. 6A and 6B) may enter the power save state until its start time and may be in the receive state for approximately the same amount of time as a STA that is served earlier (STA1 in FIGS. 6A and 6B).

The AP may schedule multiple overall service periods with PSMP back to back. In an embodiment, a first PSMP overall service period may be used for downlink and/or uplink data frames and their Acks. A second PSMP overall service period following immediately or shortly thereafter may be used for retransmissions of data frames sent in the first PSMP overall service period. Each STA that does not need any retransmission may be omitted from the second PSMP overall service period and may go to sleep.

Some applications, such as VoIP, have stringent requirements on latency. If the service interval is relatively short (e.g., 10 ms for VoIP), then it may be difficult for the AP to complete the transmissions for all STAs in the first round and then complete the possible retransmissions for the STAs in the second round within the latency requirements. Hence, completing the transmission and retransmission for one STA first before serving the next STA, as shown in FIGS. 5B and 6B, may allow each STA to meet its latency requirements.

However, if the AP allocates two downlink and two uplink data frames for each STA to allow for retransmission, as shown in FIGS. 5B and 6B, then the STAs that are served later are awake for longer periods. Furthermore, if retransmission is not needed for a given STA, then there is a gap in the overall service period, and this unused medium time may be wasted.

In yet another aspect, overlapping scheduling is used to efficiently utilize the time available for transmission, to allow the STAs to meet stringent latency requirements, and to facilitate power savings for the STAs. In an embodiment, the AP determines an overall service period for the STAs, e.g., at the initialization of the wireless network or when one or more flows for a given traffic type (e.g., VoIP) are established. The AP partitions the overall service period into service slots. A service slot may also be referred to by some other terminology. The service slots are defined such that they overlap one another. The duration of the overall service period, the number of service slots, the duration of each service slot, and the amount of overlap between service slots may be selected based on various factors such as, e.g., the number of STAs being scheduled, the amount of data for each STA, the estimated link data rate sustained with the given STA, the desired residual packet error rate (after retransmissions), the desired maximum delay bound for MAC SDU, and so on.

In an embodiment, the duration of each service slot is set to approximately twice the time to transmit a nominal data frame at a nominal rate and its Ack on each of the downlink and uplink. A nominal data frame is a frame of average size for a particular traffic type, which may be 180 bytes for VoIP. A nominal rate is a rate that is deemed to be reliable for a given link and may be determined based on signal quality measurements and a link adaptation table. The first half of a service slot may be used to send a data frame on each link, and the second half of the service slot may be used to send an additional frame or a retransmission on each link. The service slots may also be defined such that the second half of a service slot overlaps the first half of a subsequent service slot. The AP may allocate the service slots in the overall service period to the STAs, e.g., on a first come first serve basis. The AP serves each STA within its assigned service slot.

Figure 7A:
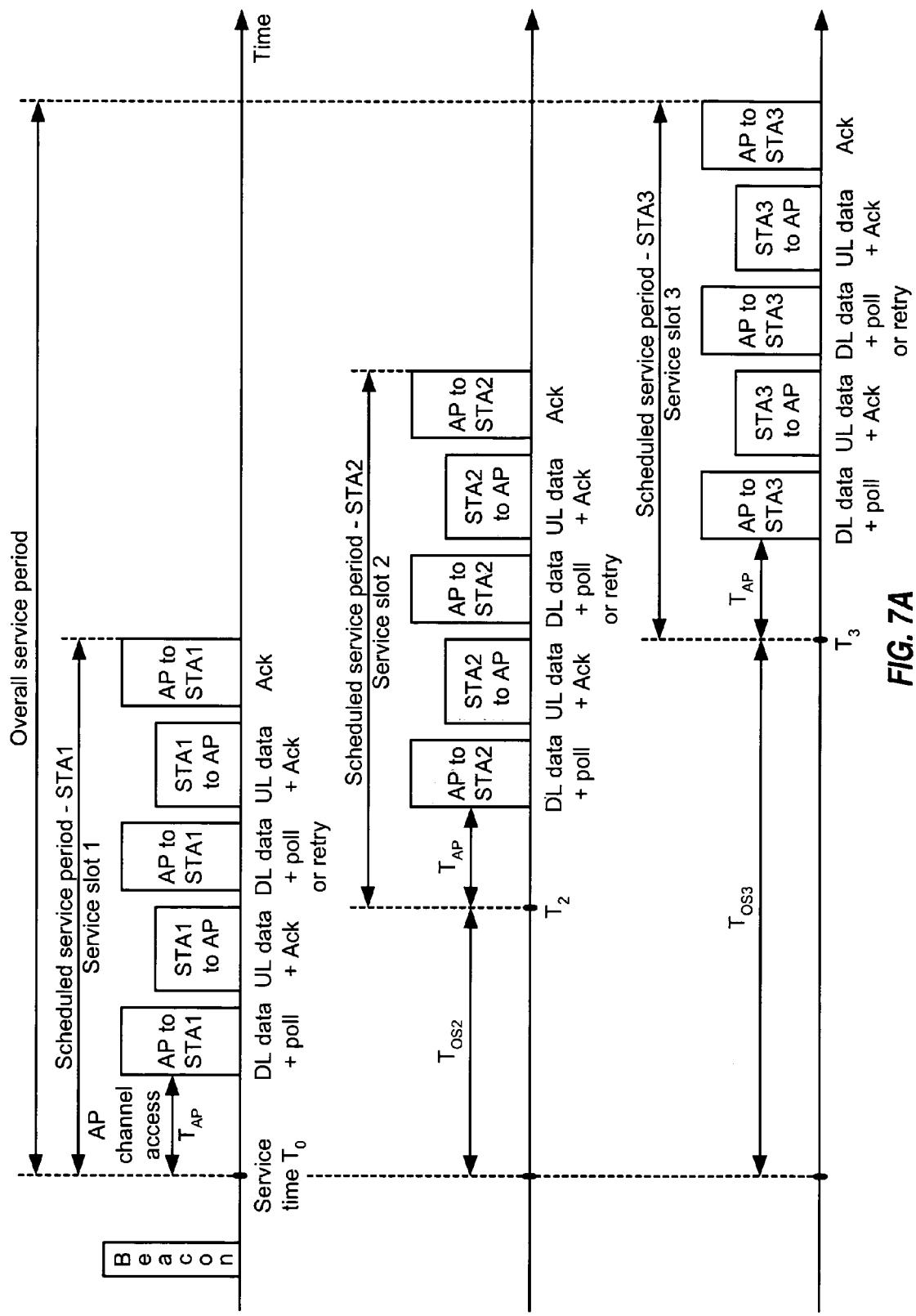
FIGS. 7A-7C show scheduled operation with overlapping service slots.

FIG. 7A shows an embodiment of scheduled APSD operation with overlapping service slots for three STAs. In the embodiment shown in FIG. 7A, each service slot covers two downlink data frames and two uplink data frames as well as their acknowledgements, or a total of five frames. Service slot 1 starts at the common service time of $T_0$. Service slot 2 starts at time $T_2$, which is offset by $T_{OS2}$ from service time $T_0$. $T_{OS2}$ is the amount of time to transmit one downlink data frame, one uplink data frame, and an Ack frame for STA1. $T_{OS2}$ may be the minimum amount of time to serve STA1. Service slot 3 starts at time $T_3$, which is offset by $T_{OS3}$ from service time $T_0$. $T_{OS3}$ is equal to $T_{OS2}$ plus the amount of time to transmit one downlink data frame, one uplink data frame, and an Ack frame for STA2. $T_{OS3}$ may be the minimum amount of time to serve STA1 and STA2. The AP allocates service slot 1 to STA1, service slot 2 to STA2, and service slot 3 to STA3. The overall service period covers service slots 1, 2 and 3 for the three STAs.

Figure 7B:
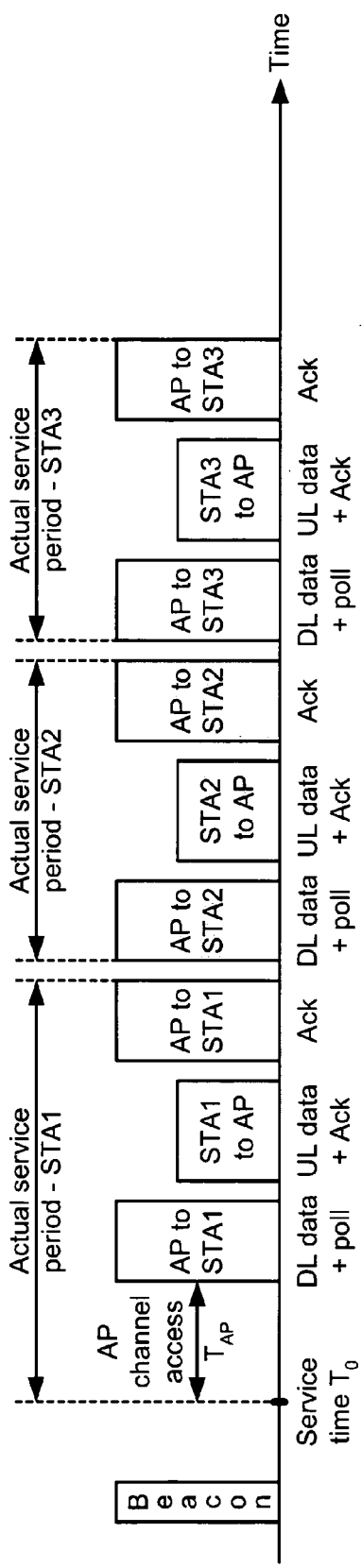

FIG. 7B shows transmission of one downlink data frame for each of the three STAs with the service slots shown in FIG. 7A. At service time $T_0$, the AP accesses the wireless medium. In the first half of service slot 1, the AP transmits a first downlink data frame to STA1, STA1 transmits an uplink data frame with an Ack for the downlink data frame, and the AP transmits an Ack for the uplink data frame. In this example, the AP does not have any more data for STA1 and sets the EOSP bit in the downlink Ack frame. STA1 may transition to the power save mode upon detecting the EOSP bit being set. The AP may then serve STA2 in similar manner as STA1. In this example, the AP transmits one downlink data frame to STA2, receives one uplink data frame with Ack from STA2, and transmits an Ack frame with the EOSP bit set. The AP may then serve STA3 in similar manner as STA1 and STA2.

Figure 7C:
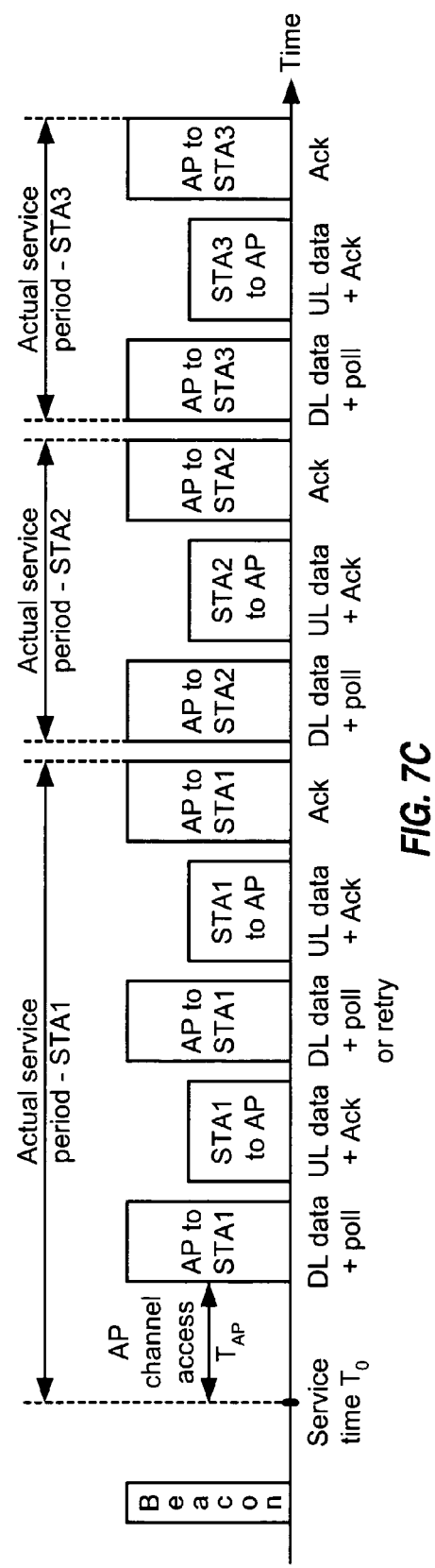

FIG. 7C shows transmission of two downlink data frames for STA1 with the service slots shown in FIG. 7A. In this example, the AP transmits a first downlink data frame to STA1, receives a first uplink data frame from STA1, transmits a second downlink data frame or retransmits the first downlink data frame to STA1, receives a second uplink data frame or retransmission of the first uplink data frame from STA1, and transmits an Ack for the first or second uplink data frame. After serving STA1, the AP serves STA2, transmits a downlink data frame to STA2, receives an uplink data frame from STA2, and transmits an Ack for the uplink data frame. The AP then serves STA3 in the same manner as STA2.

FIGS. 7B and 7C show two exemplary scenarios in which data may be exchanged between the AP and the STAs for the service slots shown in FIG. 7A. Data may also be exchanged in other manners depending on the amount of data to send and the results of the transmissions. For example, the AP may transmit two downlink data frames to STA2 or STA3 instead of STA1.

In the embodiment shown in FIGS. 7A through 7C, each service slot covers two downlink and two uplink data frames, with the second downlink and uplink frames being used for additional data or retransmission. The AP and STAs typically transmit at nominal rates that are deemed to be reliable for their links. Hence, the likelihood of losing a frame due to collision, out of range, or other conditions is typically low for each STA. In the likely scenario, retransmission is not needed for a STA, the second half of the service slot for that STA is not used, and the AP may serve the next STA early. However, if a frame for a STA is lost, then the second half of the service slot for that STA may be used for immediate retransmission. The overlapping service slots thus facilitate retransmission whenever needed while potentially reducing the awake times for the STAs that are served later.

With overlapping service slots, each STA may be awake for all or a portion of its service slot. The start of each service slot may be given relative to the common service time $T_0$, as shown in FIG. 7A. Each STA may be awake starting at the beginning of its service slot. The actual service period for each STA may be a portion of the service slot, e.g., as shown in FIGS. 7B and 7C.

FIG. 7A shows a scheduling embodiment in which each service slot covers five frames (two downlink data frames, two uplink data frames, and an Ack frame) and each service slot overlaps a prior service slot by two frames. This embodiment may be used for applications (e.g., VoIP) in which each STA typically has one downlink and one uplink data frame in each service period, with the second downlink and uplink data frames being used for additional data and/or retransmission.

Figure 8:
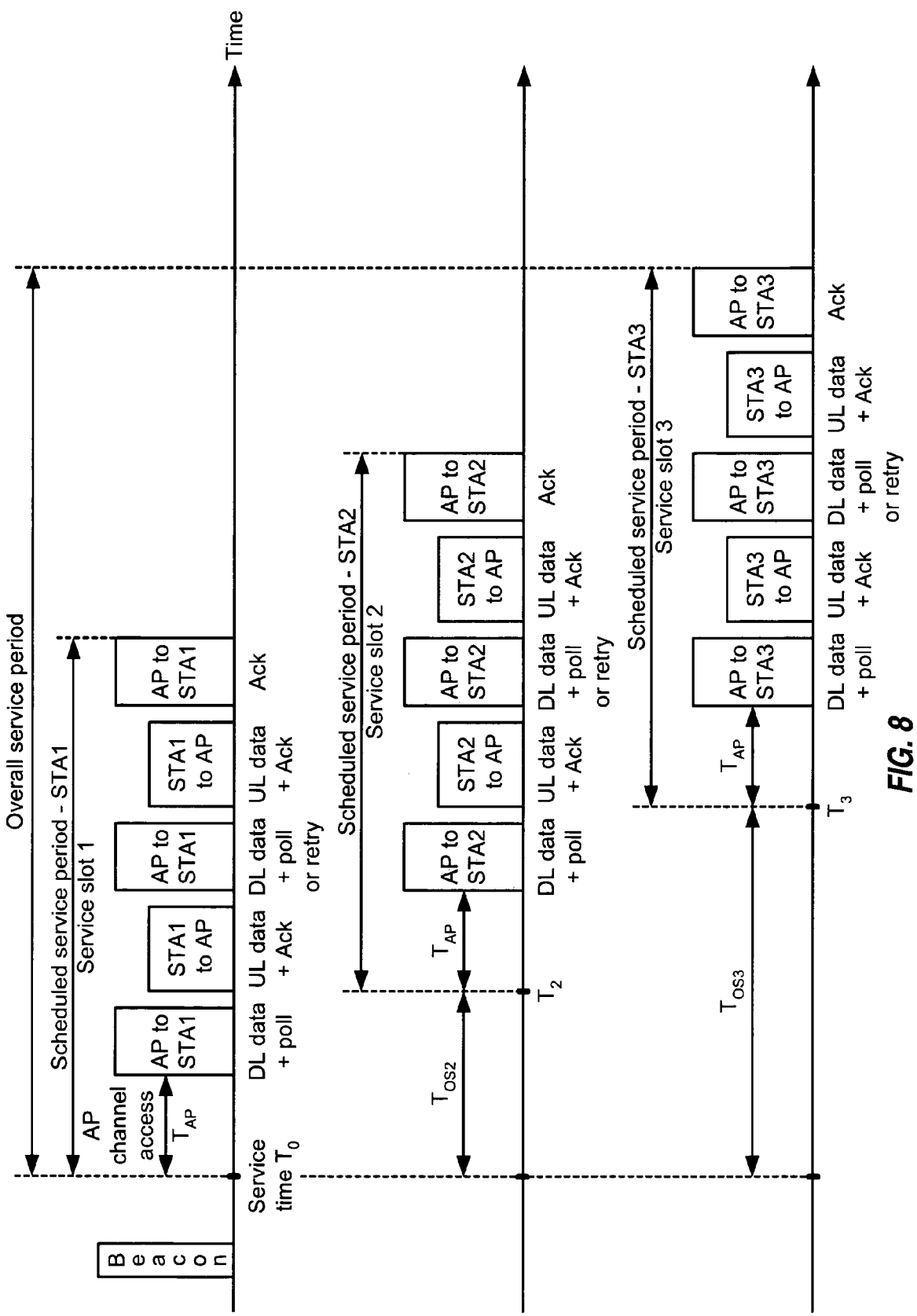
FIG. 8 shows service slots with different staggering.

FIG. 8 shows another scheduling embodiment in which each service slot covers five frames but overlaps a prior service slot by three frames (instead of two frames). This embodiment may be used for applications in which each STA typically has one downlink data frame in each service period. The other frames in the service slot may be used for additional data and/or retransmission.

In general, the service slots may be defined with equal or different durations, and each service slot may be of any duration. The service slot for each STA may be selected based on data requirements, expected payload on the downlink and uplink in each service period, estimated link data rates from the AP to the STA and from the STA to the AP, and/or other factors. The actual service slot duration for each STA may also be selected based on likelihood of additional transmissions and retransmissions for STAs that are scheduled earlier. The actual start time for a given STA is dependent on when the AP completes serving the earlier STAs. The actual start time for a STA that is served later typically has greater variability than the actual start time for a STA that is served earlier. Hence, the service slots for later STAs may be extended to account for greater variations in the actual start times for these STAs.

In general, the service slots may overlap one another by equal or different amounts, and each service slot may overlap another service slot by any amount. The amount of overlap may be selected based on frame error probability (which affects retransmission), the likelihood and amount of additional data to send, the amount of variations in the actual start times, and so on. The same amount of overlap may be used for all STAs, e.g., as shown in FIGS. 7A and 8. Alternatively, different amounts of overlap may be used for different STAs. For example, more overlap may be used for later STAs to account for greater variations in their actual start times.

In an embodiment, the service slots are defined based on the minimum amount of data to send to each STA in the service period. If a minimum of one downlink data frame and one uplink data frame are sent for each STA, then the start of the service slots may be defined as shown in FIG. 7A. If a minimum of one downlink data frame is sent for each STA, then the start of the service slots may be defined as shown in FIG. 8. This embodiment ensures that each STA will be awake at the earliest time that data might be sent to that STA.

The service slots may be defined to be sufficiently long to ensure that each STA remains awake for its transmission. A long service slot may not significantly impact power savings since each STA may go to sleep as soon as the EOSP bit is set and may not need to be awake for the entire duration of the service slot.

FIGS. 7A through 8 show the service slots in one service interval. The service slots may be repeated in each service interval, which may be, e.g., 10 or 20 ms for VoIP. The AP may serve the scheduled STAs multiple times in each beacon interval A schedule with the service slots may be formed and/or updated in various manners. In an embodiment, a flow is assigned a suitable service slot when the flow is established, and the assigned service slot does not change for the entire duration of the flow. When the flow is terminated, the service slot assigned to the flow becomes open and may be assigned to another flow. In another embodiment, the schedule may be updated as flows are added or dropped. In this embodiment, the active flows may be assigned new service slots in order to reduce unused gaps between assigned service slots. In general, the service slot for each STA may be conveyed during flow establishment with the TSPEC (11e) procedure, in the beacon, in frames sent to the STA, and/or in other manners. Changes and updates to the schedule may be conveyed in the beacon or frames sent to the STAs.

Overlapping service slots may also be used in conjunction with PSMP. PSMP allows the service slots to be updated in each service interval, which may enhance power savings.

Figure 9A:
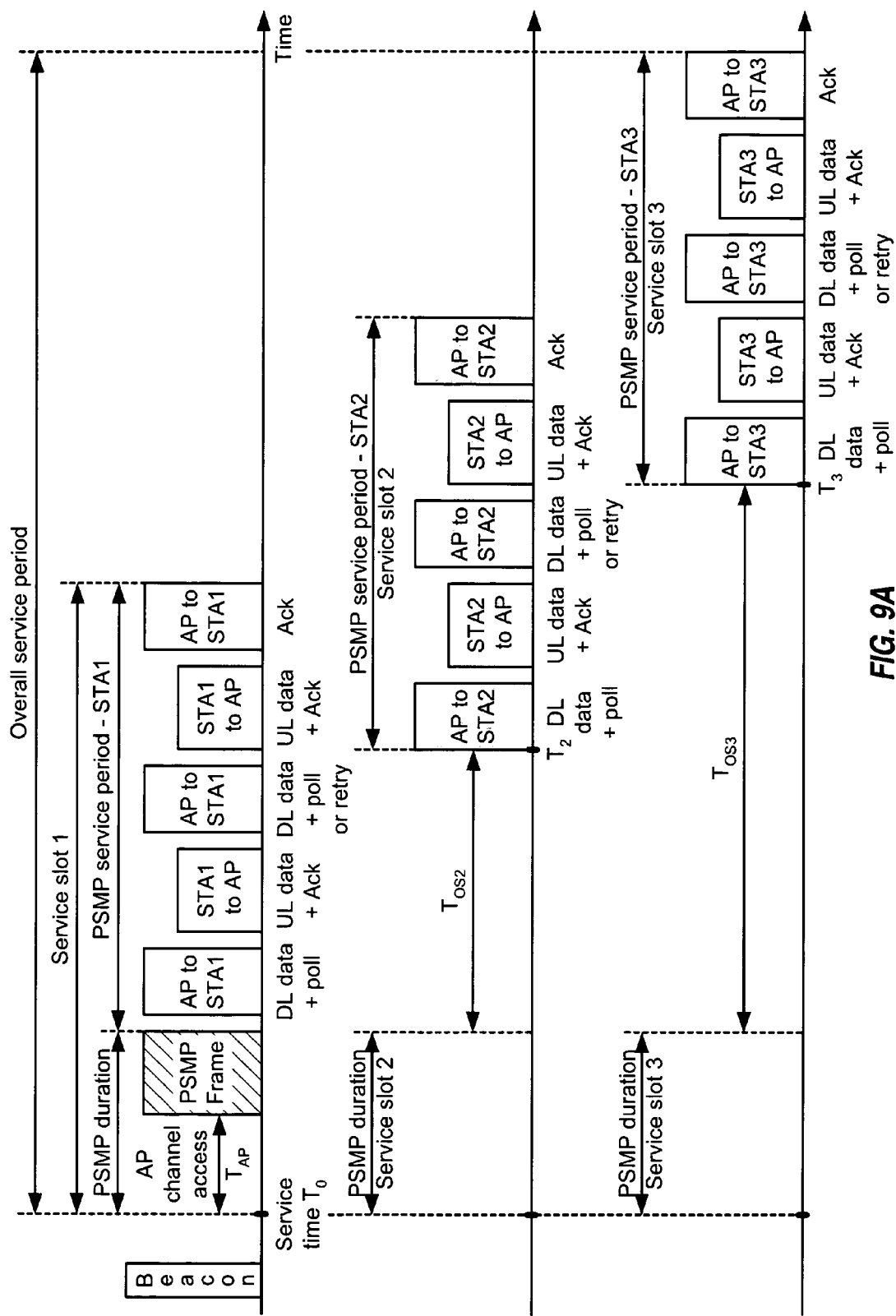
FIGS. 9A-9C show scheduled operation with overlapping service slots and PSMP.

FIG. 9A shows an embodiment of scheduled APSD operation with overlapping service slots and PSMP for three STAs. In the embodiment shown in FIG. 9A, each service slot assigned with PSMP covers a total of five frames for two downlink data frames, two uplink data frames, and their acknowledgements. Each service slot further covers a PSMP frame. The service slots overlap one another as described above for FIG. 7A. The AP allocates service slot 1 to STA1, service slot 2 to STA2, and service slot 3 to STA3.

Figure 9B:
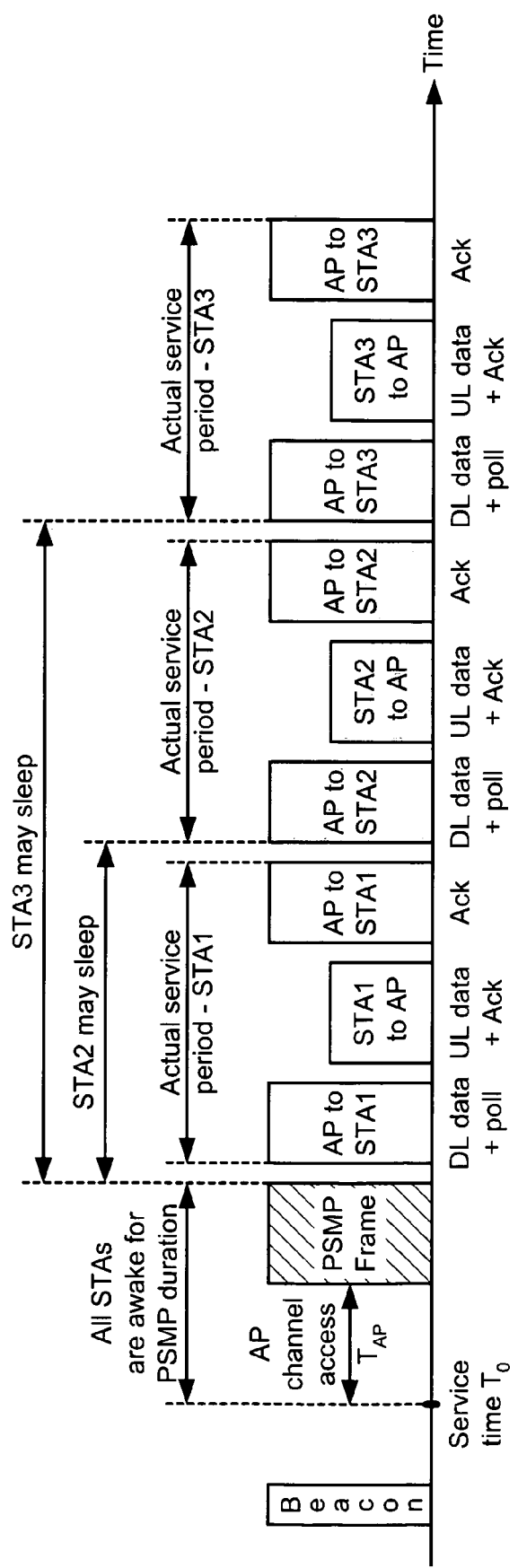

FIG. 9B shows exemplary transmissions for the three STAs with overlapping service slots and PSMP. At service time $T_0$, the AP accesses the wireless medium and transmits a PSMP frame to the STAs. The PSMP frame conveys the service slots assigned to the STAs. All three STAs receive the PSMP frame and determine their service slots. STA2 and STA3 may decide to enter the power save state until their start times $T_2$ and $T_3$, respectively, which are shown in FIG. 9A. The AP serves STA1, then STA2, then STA3 as described above for FIG. 7B. Each STA may enter the power save mode prior to the end of its service slot upon detecting the EOSP bit being set.

Figure 9C:
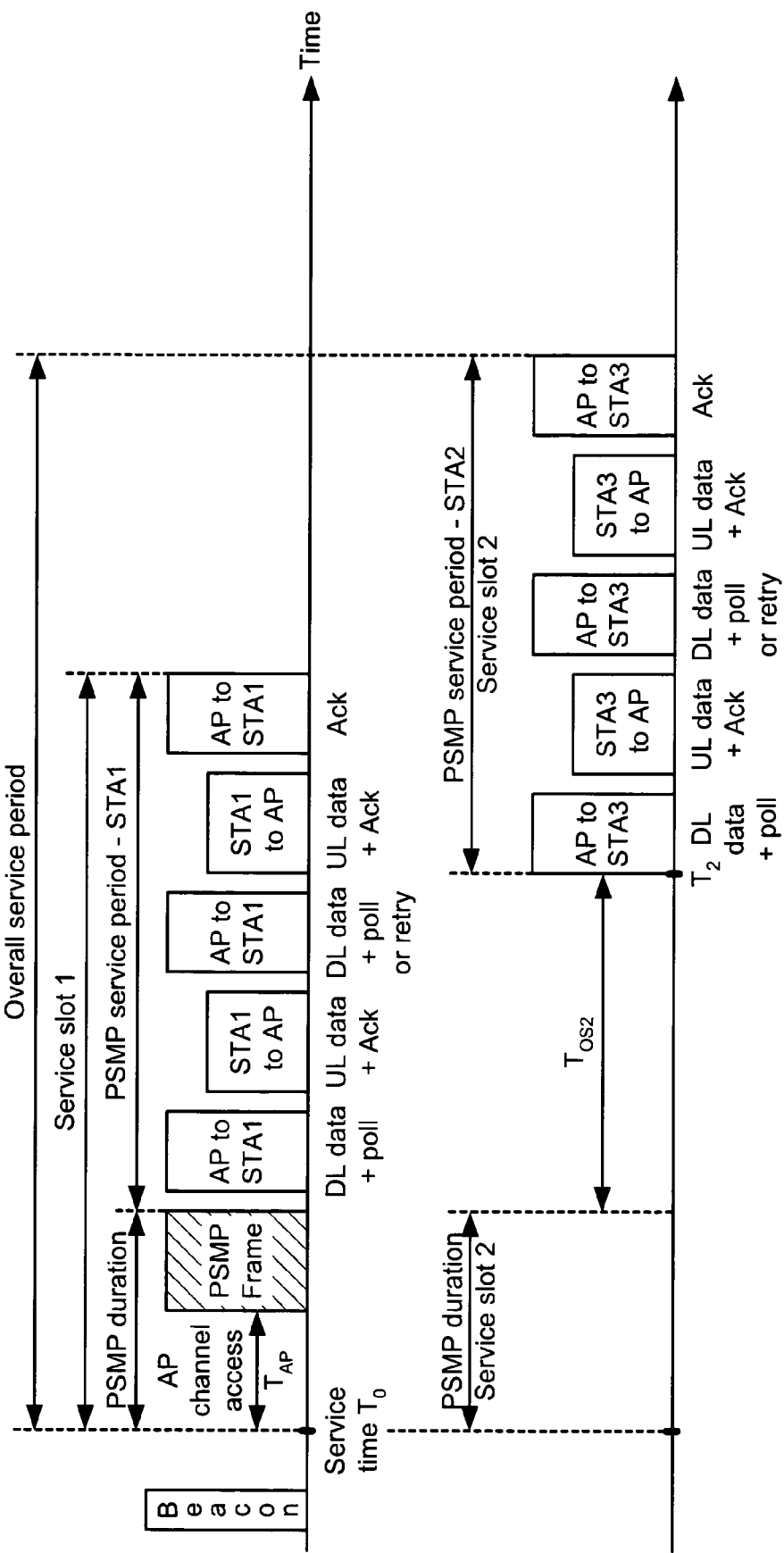

FIG. 9C shows the service slots for STA1 and STA3, after the call for STA2 is completed. In the embodiment shown in FIG. 9C, the AP assigns service slot 1 to STA1 and assigns service slot 2 to STA3. As shown in FIG. 9C, when STA2 completes its call, the AP may change the service slot and the start time for STA3, which still has a call in progress. If STA1 instead of STA2 has completed its call, then the AP may assign service slot 1 to STA2 and service slot 2 to STA3.

In general, PSMP allows the AP to flexibly update the schedule for the STAs in each service interval. Whenever a flow is terminated or a STA completes a call, the AP may rearrange the schedule for the next service interval. This flexible scheduling allows the AP to efficiently manage resources and remove unused holes in the schedule.

For overlapping service slots with PSMP, each STA may be awake for $T_{PSMP}$ plus all or part of the remaining portion of its service slot. $T_{PSMP}$ includes the channel access delay for the AP and the duration of the PSMP frame. The STAs know the service time $T_0$ for the PSMP frame in each service interval and may wake up to receive the PSMP frame. The STAs may obtain their service slots from the PSMP frame and may go to sleep until the start of their service slots.

In another embodiment of overlapping service slots, the AP determines an overall service period for the STAs and divides the overall service period into non-overlapping transmission slots. A transmission slot may also be referred to by some other terminology. Each transmission slot may cover one or more downlink frames and one or more uplink frames. The duration of the overall service period, the number of transmission slots, and the duration of each transmission slot may be selected based on various factors such as, e.g., the number of STAs being scheduled, the amount of data for each STA, and so on.

In an embodiment, the duration of each transmission slot is set to approximately the time to transmit a nominal data frame (e.g., 60-180 bytes for VoIP) at a nominal rate on one link. In another embodiment, the duration of each transmission slot is set to approximately the time to transmit a nominal data frame at a nominal rate on each of the downlink and uplink. In yet another embodiment, the duration of each transmission slot is set to approximately the time to transmit a nominal data frame at a predetermined rate (e.g., 24 Mbps). In yet another embodiment, the duration of each transmission slot is set to a fixed duration, e.g., 500 µs, 1 ms, or some other duration.

The transmission slots in the overall service period may be numbered sequentially, e.g., 1, 2, 3, and so on. Each STA may be assigned a sufficient number of transmission slots to cover expected transmission and retransmission for that STA in the service interval. A given transmission slot may be assigned to multiple STAs.

Figure 10:
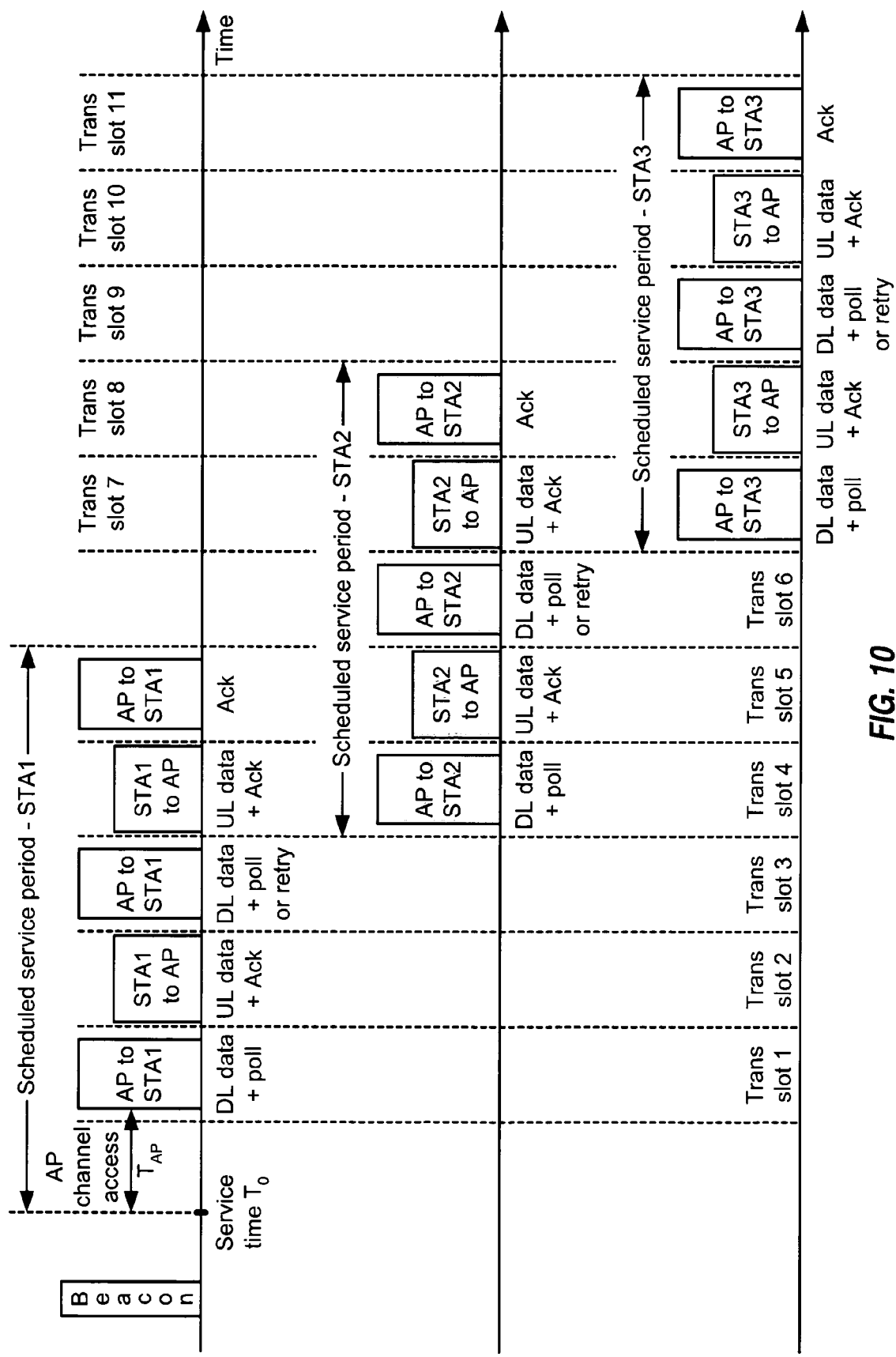
FIG. 10 shows service slots given in units of transmission slots.

FIG. 10 shows an embodiment of scheduled APSD operation with overlapping service slots given in units of transmission slots. In the embodiment shown in FIG. 10, each transmission slot (trans slot) may be used to send one frame on one link. Each STA is assigned five transmission slots that may be used to send two downlink data frames, two uplink data frames, and an Ack frame. STA1 is assigned transmission slots 1 through 5, STA2 is assigned transmission slots 4 through 8, and STA3 is assigned transmission slots 7 through 11. The scheduled service period or service slot for each STA is formed by all of the transmission slots assigned to that STA. The scheduled service periods for STA1 and STA2 overlap in transmission slots 4 and 5. The scheduled service periods for STA2 and STA3 overlap in transmission slots 7 and 8. The AP may serve each STA using any of the transmission slots assigned to that STA.

In general, the transmission slots may be defined with any duration. Furthermore, a given STA may be assigned any number of transmission slots and any one of the available transmission slots. STAs that are scheduled next to each other may share any number of transmission slots. The transmission slot structure may simplify signaling to convey the scheduled service period for each STA. For example, a scheduled service period may be conveyed by (1) the first and last assigned transmission slots, (2) the first transmission slot and the number of transmission slots, or (3) in some other manner.

Figure 11:
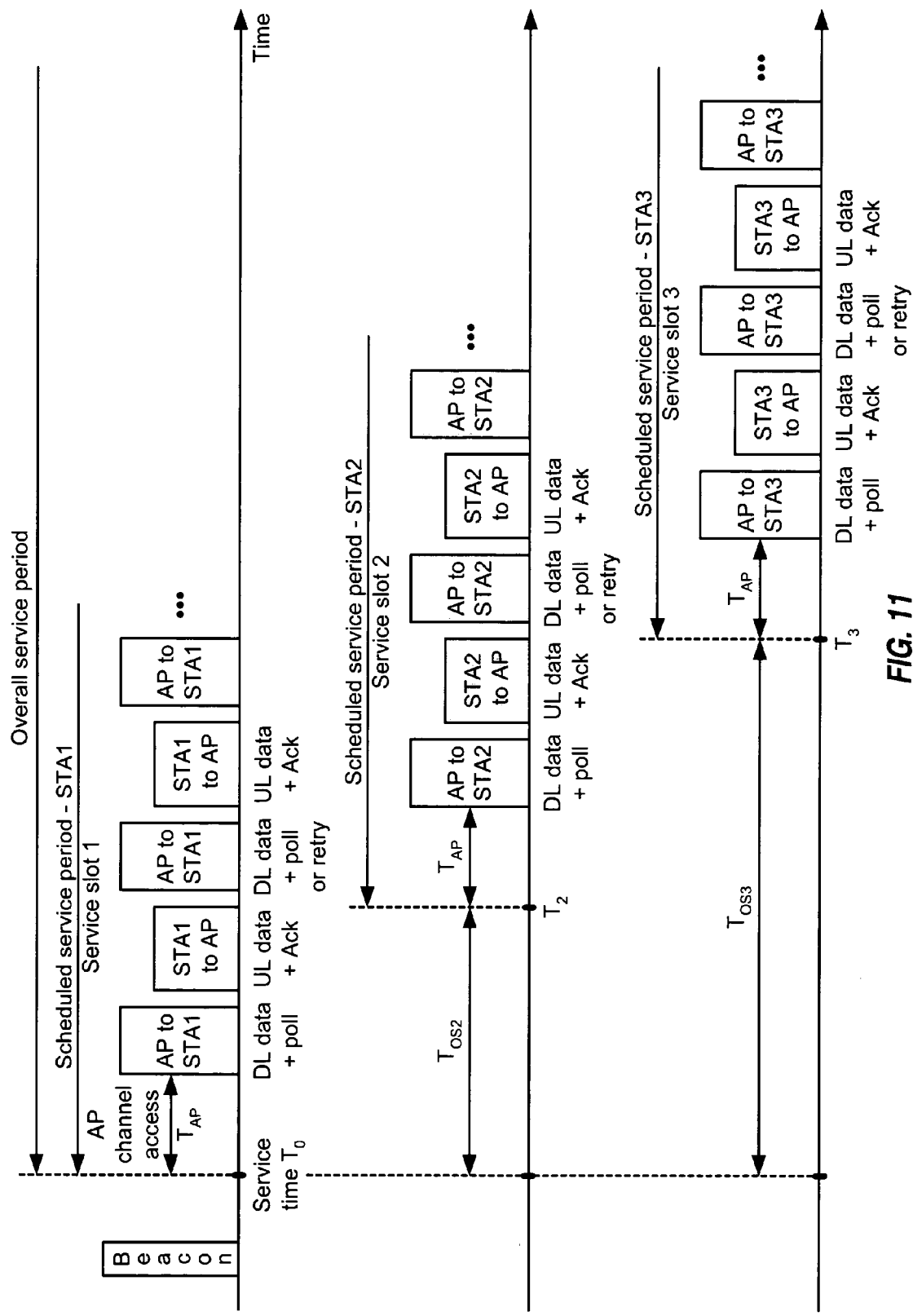
FIG. 11 shows scheduled operation with overlapping service slots.

FIG. 11 shows another embodiment of scheduled APSD operation with overlapping service slots for three STAs. In the embodiment shown in FIG. 11, each service slot starts at a specific start time and ends at the end of the overall service period or possibly earlier. Service slot 1 starts at the common service time of $T_0$, service slot 2 starts at $T_2$, which is offset by $T_{OS2}$ from $T_0$, and service slot 3 starts at $T_3$, which is offset by $T_{OS3}$ from $T_0$. $T_{OS2}$ may be the minimum amount of time to serve STA1, and $T_{OS3}$ may be the minimum amount of time to serve STA1 and STA2. The AP allocates service slot 1 to STA1, service slot 2 to STA2, and service slot 3 to STA3.

In the embodiment shown in FIG. 11, each STA monitors for transmission to that STA beginning at its start time. Each STA may exchange any number of frames with the AP. Each STA may enter the power save mode upon receiving an EOSP bit that is set, at the expiry of its scheduled service period, or at the expiry of the overall service period. The embodiment in FIG. 11 allows for any number of additional transmissions and retransmissions for the STAs.

In the embodiments described above, the AP performs channel access for each overall service period prior to transmission on the downlink. The channel access duration is variable and depends on activity in the channel. Each STA is awake for the duration of the channel access by the AP. The AP has priority in accessing the channel and may gain access to the channel after waiting a shorter amount of time (PIFS time) than a STA. However, the channel access delay $T_{AP}$ is dependent on current traffic conditions in the channel and the time required for any pending transmissions to complete. If traffic is present in the channel, then it may be difficult to predict when the pending transmissions will be completed. If the pending transmissions are multiple frame transmissions separated by SIFS time, then the AP would need to wait until the frame exchange sequence is completed before it can access the channel. The variable channel access delay dictates when the AP can implement scheduled APSD operation for the STAs, which in turn affects power savings for these STAs.

The AP may limit the maximum transmission by the STAs in order to limit the worst case channel access delay $T_{AP}$. IEEE 802.11e defines QoS procedures that allow the TXOP to be defined for each access class for contention-based traffic. Four access classes are defined for voice, video, best effort, and background. A TXOP limit of '0' for a given access class indicates that a STA can transmit only one data frame per channel access for that access class. The AP may set the TXOP limit for each of the four access classes to '0'. This setting reduces the worst case channel access delay for the AP to the time required to transmit a maximum size packet (typically 1500 bytes) at a mean rate plus one SIFS time plus the time required for the following Ack plus a PIFS time. For a mean rate of 24 Mbps, the worst case channel access delay when a single STA accesses it concurrently may be less than 700 μs for each overall service interval.

In yet another aspect, the AP blocks off designated periods of time for scheduled APSD operation and informs the STAs within its coverage area of these designated periods. A designated period may be used for one or more overall service periods for one or more traffic types. The designated periods may be separated by the service interval for the STAs being served in these designated periods. The AP may send signaling in the beacon to inform the STAs of the designated periods within the beacon interval and/or may convey the designated periods in other manners including a CTS-to-self transmission. By informing the STAs of the designated periods, the AP may be reasonably assured that the channel will be clear during these periods. Hence, the AP may transmit data at the start of a designated period without having to perform channel access.

Figure 12:
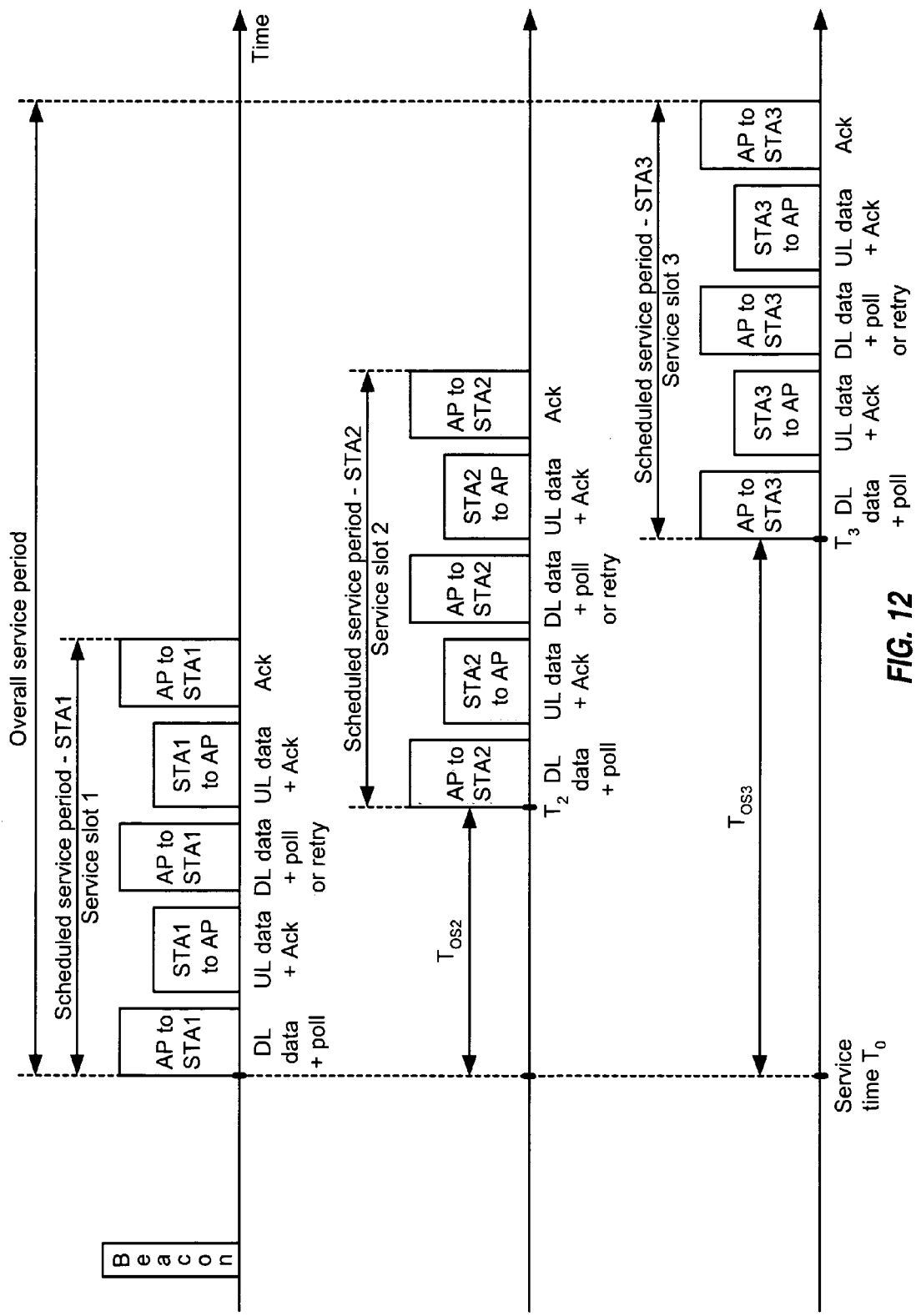
FIG. 12 shows scheduled operation with overlapping service slots in a designated period.

FIG. 12 shows an embodiment of scheduled APSD operation with overlapping service slots in a designated period for three STAs. In the embodiment shown in FIG. 12, the designated period starts at $T_0$, which is used as the common service time for the three STAs. The designated period is partitioned into three overlapping service slots. Each service slot covers a total of five frames for two downlink data frames, two uplink data frames, and an Ack frame. Service slot 1 starts at $T_0$, service slot 2 starts at $T_2$, which is $T_{OS2}$ from $T_0$, and service slot 3 starts at $T_3$, which is $T_{OS3}$ from $T_0$. $T_{OS2}$ may be the minimum amount of time to serve STA1, and $T_{OS3}$ may be the minimum amount of time to serve STA1 and STA2. The AP allocates service slot 1 to STA1, service slot 2 to STA2, and service slot 3 to STA3. The AP may transmit a first downlink data frame to STA1 at service time $T_0$, without having to perform channel access. STA2 and STA3 may sleep until their start times $T_2$ and $T_3$, respectively.

Figure 13:
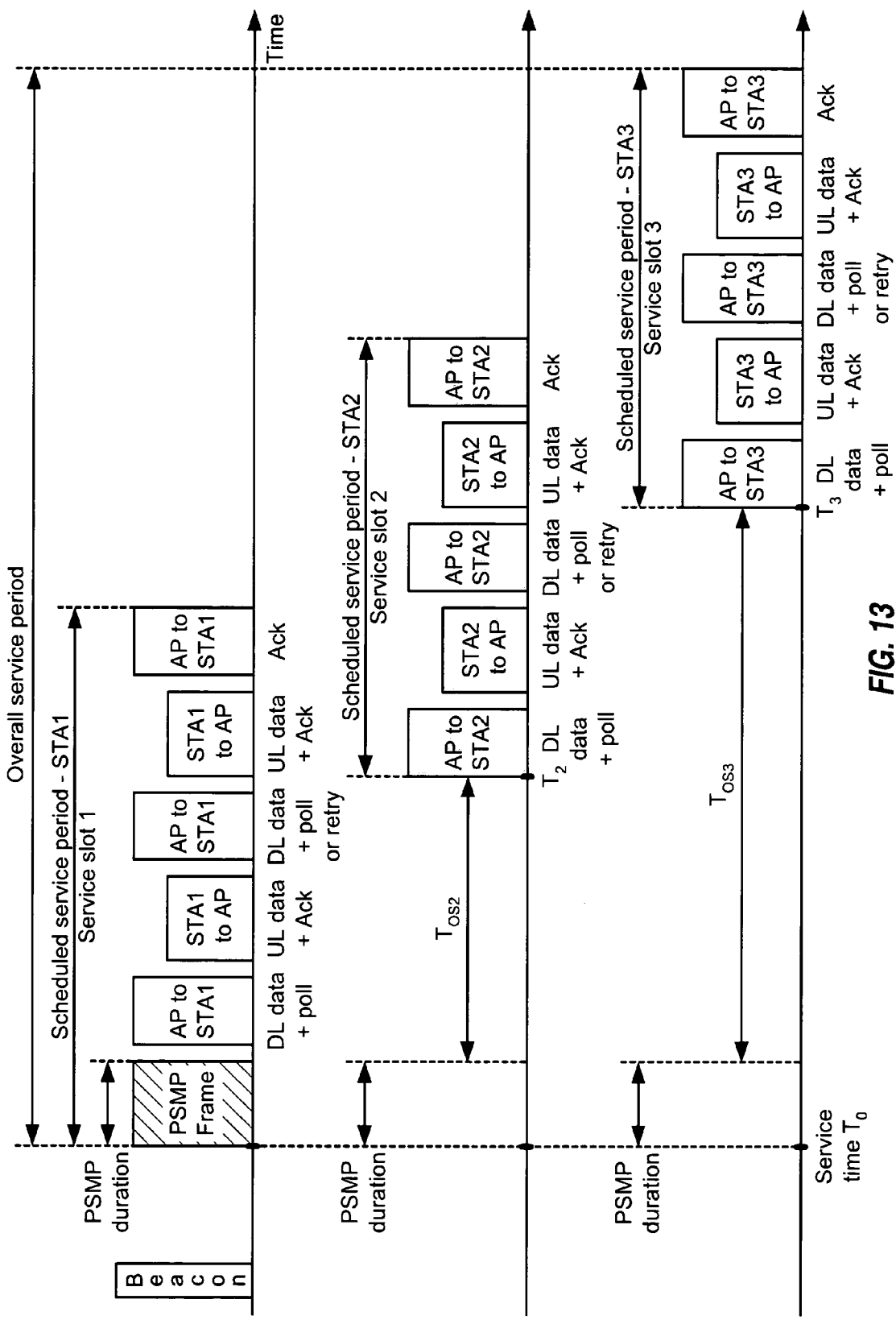
FIG. 13 shows scheduled operation with PSMP in a designated period.

FIG. 13 shows an embodiment of scheduled APSD operation with overlapping service slots and PSMP in a designated period for three STAs. In the embodiment shown in FIG. 13, the designated period starts at $T_0$ and is partitioned into three overlapping service slots. In this embodiment, the AP may transmit a PSMP frame at service time $T_0$, without having to perform channel access. Each STA may receive the PSMP frame at $T_0$, determine its start time, and decide whether to sleep until its start time.

In the embodiments shown in FIGS. 12 and 13, the AP and STAs know the designated periods in advance and has reserved the channel by any one of the techniques described above. Hence, the AP may transmit right away without performing channel access. Furthermore, the STAs know their start times with certainty, do not need to be awake for a variable channel access period $T_{AP}$, and may sleep longer. The service time of previous STA may be variable however.

For all scheduling embodiments described above, the STAs may be scheduled in an order determined based on various factors such as, e.g., the power sources for the STAs, the available power for battery-operated STAs, link qualities for the STAs, the amount of data to exchange with the STAs, billing, and so on. In an embodiment, a STA with low power capability may be scheduled first or early, and a STA with high power capability (e.g., an AC-powered STA) may be scheduled last or later. Power may be quantified by total battery capacity or remaining battery capacity. In another embodiment, a STA with a high quality link (e.g., a STA located close to the AP) may be scheduled first or earlier since the service time for this STA may have low variance. STAs with poor link qualities or unreliable links may be scheduled later. In yet another embodiment, the order of the schedule may be determined based on cost of service, e.g., a STA paying more for service may be scheduled earlier and may be able to save more power.

Figures 14, 15:
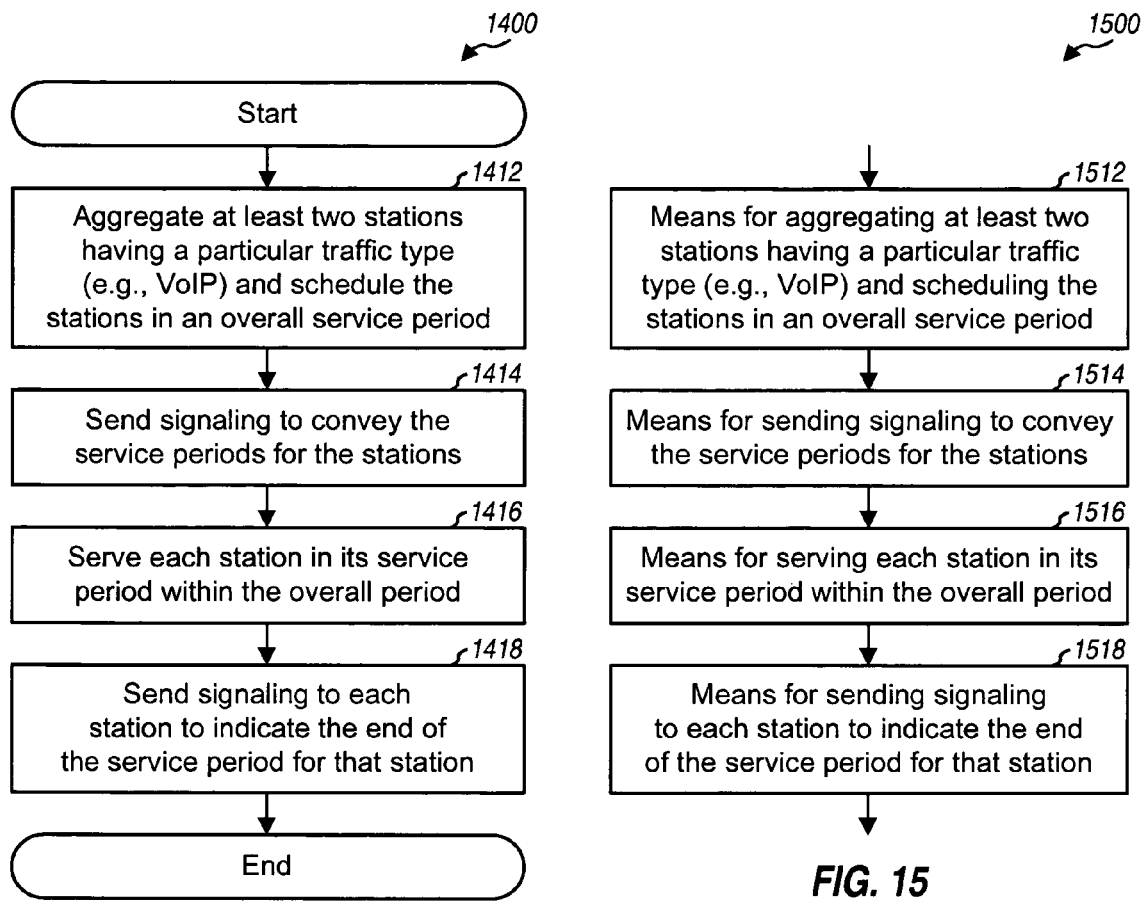
FIG. 14 shows a process to schedule and serve stations with aggregation.
FIG. 15 shows an apparatus to schedule and serve stations with aggregation.

FIG. 14 shows an embodiment of a process 1400 for scheduling and serving stations with aggregation. Process 1400 may be performed by an access point. At least two stations with a particular traffic type (e.g., VoIP) are aggregated and scheduled in an overall service period (block 1412). The overall service period includes a service period for each station. The service periods for the stations may be staggered and/or may overlap. The service periods for the stations may start at the beginning of the overall service period (e.g., as shown in FIG. 5A) or may be staggered and start at different times (e.g., as shown in FIGS. 6A, 7A and 9A). The service periods for the stations may end at different times (e.g., as shown in FIGS. 5A and 7A). The service periods for the stations may overlap during the data portion (e.g., as shown in FIGS. 5A and 7A) or may not overlap during the data portion (e.g., as shown in FIGS. 6A and 9A). The overall service period may be repeated at a predetermined interval. Signaling may be sent (e.g., in a beacon, a PSMP frame, data frames, and so on) to convey the service periods for the stations (block 1414).

Each station is served in its service period within the overall service period (block 1416). In general, any number of data frames may be sent on the downlink to the station and any number of data frames may be received on the uplink from the station during the service period. Signaling may be sent to the station to indicate the end of the service period (block 1418). Alternatively or additionally, the service period may end at a designated time.

FIG. 15 shows an embodiment of an apparatus 1500 for scheduling and serving stations with aggregation. Apparatus 1500 includes means for aggregating and scheduling at least two stations with a particular traffic type (e.g., VoIP) in an overall service period (block 1512), means for sending signaling (e.g., in a beacon, a PSMP frame, and so on) to convey the service periods for the stations (block 1514), means for serving each station in its service period within the overall service period (block 1516), and means for sending signaling (e.g., an EOSP bit) to each station to indicate the end of the service period for that station (block 1518).

FIG. 16 shows an embodiment of a process 1600 for scheduling and serving stations with staggering and overlapping. Process 1600 may be performed by an access point. A first station is scheduled for a first period having a first duration, a first start time, and a first end time (block 1612). A second station is scheduled for a second period having a second duration, a second start time that is prior to the first end time, and a second end time (block 1614). A third station may be scheduled for a third period having a third duration, a third start time that is prior to the second end time, and a third end time (block 1616). The first, second and third end times may be at different times (e.g., as shown in FIG. 7A) or at the same time (e.g., at the end of the overall service period). The first, second and third periods are staggered and overlap one another. The first, second and third periods may be three overlapping service slots, e.g., as shown in FIG. 7A or 9A.

The first, second and third durations may be selected based on expected data payload, data requirements, probability of frame errors, and so on. The first, second and third periods may cover equal number of data frames (e.g., two data frames on each link). The first, second and third periods may have the same or different durations. The first period may include a first part for initial transmission for the first station and a second part for additional transmission and/or retransmission for the first station. The second start time may be at the end of the first part of the first period. The second start time may also be at approximately a midpoint between the first start time and the first end time. The first, second, and third periods may be repeated at a predetermined interval, which may be, e.g., within a range of 10 to 20 ms for VoIP.

The first, second and third periods and the predetermined interval may be conveyed in a beacon, in a multi poll frame (a PSMP frame), during call or link establishment, in data frames, and so on. The first, second and third periods may be fixed for the duration of the calls or may be updated during the calls.

A first transmission is sent to the first station during the first period (block 1622). Channel access may be performed prior to the first transmission, if needed, or may be omitted if the overall service period is blocked off. An indication of completion of the first transmission (e.g., an EOSP bit) is sent to the first station, potentially prior to the end of the first period (block 1624). A second transmission is sent to the second station during the second period and potentially prior to the end of the first period (block 1626). An indication of completion of the second transmission is sent to the second station, potentially prior to the end of the second period (block 1628). A third transmission is sent to the third station during the third period and potentially prior to the end of the second period (block 1630). Each transmission may be for one or more data frames on the downlink and/or one or more data frames on the uplink. Each transmission may also include data being resent due to frame loss. The data frames may be for VoIP and/or some other type of traffic.

FIG. 17 shows an embodiment of an apparatus 1700 for scheduling stations with staggering and overlapping. Apparatus 1700 includes means for scheduling a first station for a first period having a first duration, a first start time, and a first end time (block 1712), means for scheduling a second station for a second period having a second duration, a second start time that is prior to the first end time, and a second end time (block 1714), means for scheduling a third station for a third period having a third duration, a third start time that is prior to the second end time, and a third end time (block 1716), means for sending a first transmission to the first station during the first period (block 1722), means for sending to the first station an indication of completion of the first transmission (e.g., an EOSP bit), potentially prior to the end of the first period (block 1724), means for sending a second transmission to the second station during the second period and potentially prior to the end of the first period (block 1726), means for sending to the second station an indication of completion of the second transmission, potentially prior to the end of the second period (block 1728), and means for sending a third transmission to the third station during the third period and potentially prior to the end of the second period (block 1730).

FIG. 18 shows an embodiment of a process 1800 for operating a station, e.g., a terminal. The station receives signaling for a first period during which the station may receive transmission (block 1812). The first period overlaps a second period in which another station may receive transmission. The first period may also be repeated at a predetermined interval. The signaling may be received via a multi poll (PSMP) frame, a beacon, a frame sent during call establishment, a frame sent during a prior service period, and so on. If the signaling is received prior to the first period (e.g., in a multi poll frame), then the station may determine whether to power down a receive chain based on the length of time from reception of the signaling to the start of the first period (block 1814).

The station monitors for transmission sent to the station during the first period, e.g., starting at the beginning of first period (block 1816). The station may receive a transmission for one or more data frames on the downlink and/or may send one or more data frames on the uplink during the first period (block 1818). The station may transition to a power save mode prior to the end of the first period upon receiving an indication of completion of the transmission for the station, e.g., an EOSP bit (block 1820).

FIG. 19 shows an embodiment of an apparatus 1900 for a station. Apparatus 1900 includes means for receiving signaling for a first period during which the station may receive transmission, where the first period overlaps a second period in which another station may receive transmission (block 1912), means for determining whether to power down a receive chain based on the length of time from reception of the signaling to the start of the first period (block 1914), means for monitoring for transmission sent to the station during the first period, e.g., starting at the beginning of first period (block 1916), means for receiving a transmission for one or more data frames on the downlink and/or sending one or more data frames on the uplink during the first period (block 1918), and means for transitioning to a power save mode prior to the end of the first period upon receiving an indication of completion of the transmission for the station, e.g., an EOSP bit (block 1920).

Figure 20:
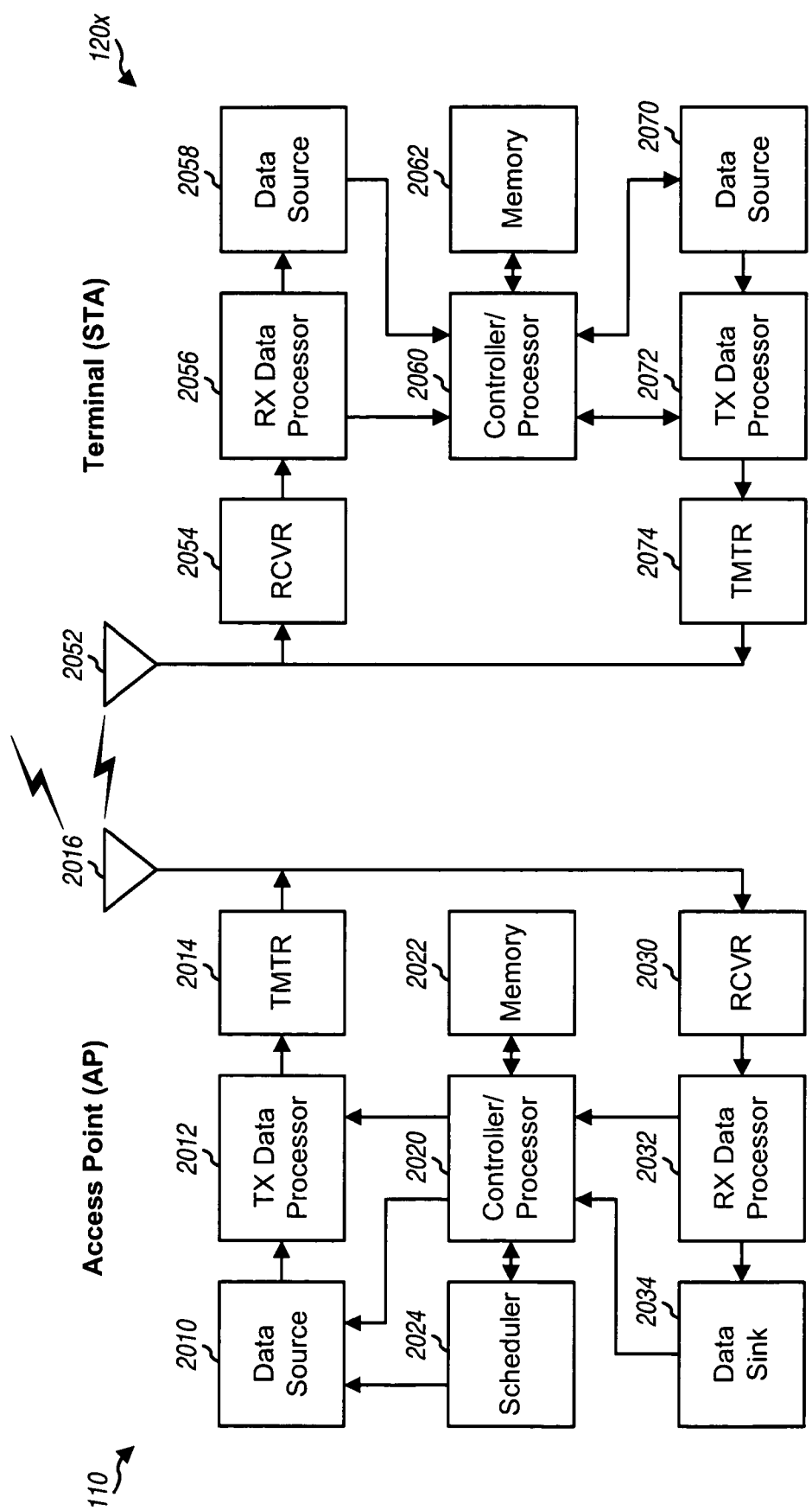
FIG. 20 shows a block diagram of the access point and a terminal.

FIG. 20 shows a block diagram of access point 110 and terminal 120x, which may be one of the terminals in FIG. 1. On the downlink, at access point 110, a transmit (TX) data processor 2012 receives traffic data from a data source 2010 for the terminals scheduled for transmission, control data (e.g., Acks) from a controller/processor 2020, and scheduling information from a scheduler 2024. TX data processor 2012 processes (e.g., encodes, interleaves, modulates, and scrambles) the data for each terminal based on a rate selected for that terminal, processes control data and scheduling information, and generates data chips. A transmitter (TMTR) 2014 processes (e.g., converts to analog, amplifies, filters, and frequency upconverts) the data chips and generates a downlink signal, which is transmitted from an antenna 2016 to the terminals.

At terminal 120x, an antenna 2052 receives the downlink signal from access point 110 and provides a received signal. A receiver (RCVR) 2054 processes the received signal and provides samples. A receive (RX) data processor 2056 processes (e.g., descrambles, demodulates, deinterleaves, and decodes) the samples, provides decoded data for user terminal 120x to a data sink 2058, and provides control data and scheduling information to a controller/processor 2060.

On the uplink, at terminal 120x, a TX data processor 2072 receives traffic data from a data source 2070 and control data (e.g., Acks) from controller/processor 2060. TX data processor 2072 processes the traffic and control data based on a rate selected for the terminal and generates data chips. A transmitter 2074 processes the data chips and generates an uplink signal, which is transmitted from antenna 2052 to access point 110.

At access point 110, antenna 2016 receives the uplink signals from the terminals. A receiver 2030 processes a received signal from antenna 2016 and provides samples. An RX data processor 2032 processes the samples and provides decoded data for each terminal to a data sink 2034 and provides control data to controller/processor 2020.

Controllers/processors 2020 and 2060 direct operation at access point 110 and terminal 120x, respectively. Scheduler 2024 performs scheduling for the terminals based on any of the embodiments described above. Scheduler 2024 may reside at the access point, as shown in FIG. 20, or at another network entity.

The scheduling and transmission techniques described herein may be implemented by various means. For example, these techniques may be implemented in hardware, firmware, software, or a combination thereof. For a hardware implementation, the processing units for an access point or a terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 2022 or 2062 in FIG. 20) and executed by a processor (e.g., processor 2020 or 2060). The memory may be implemented within the processor or external to the processor.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   at least one processor configured
   to schedule a first station for a first period having a first duration, a first start time, and a first end time, and
   to schedule a second station for a second period having a second duration and a second start time that is prior to the first end time, wherein the at least one processor is configured
   to schedule a third station for a third period having a third duration and a third start time that is prior to a second end time for the second period; and
   a memory coupled to the at least one processor.

2. The apparatus of claim 1, wherein the at least one processor is configured
   to send a first transmission to the first station during the first period,
   to send prior to the first end time an indication of completion of the first transmission, and
   to send a second transmission to the second station during the second period and prior to the first end time.

3. The apparatus of claim 2, wherein the at least one processor is configured
   to perform channel access prior to the first transmission.

4. The apparatus of claim 2, wherein the at least one processor is configured
   to send the first transmission without performing channel access.

5. The apparatus of claim 1, wherein the first period comprises a first part for initial transmission for the first station and a second part for additional transmission or retransmission for the first station, and wherein the second start time is at the end of the first part.

6. The apparatus of claim 5, wherein the first part covers a first data frame to the first station, a second data frame from the first station, and an acknowledgement for the second data frame.

7. The apparatus of claim 1, wherein the first duration is approximately equal to the duration of two data frames for each of downlink and uplink.

8. The apparatus of claim 1, wherein the first and second periods cover equal number of data frames.

9. The apparatus of claim 1, wherein the first and second durations are equal.

10. The apparatus of claim 1, wherein the second start time is at approximately a midpoint between the first start time and the first end time.

11. The apparatus of claim 1, wherein the first period covers a first set of transmission slots and the second period covers a second set of transmission slots that includes at least one transmission slot in the first set.

12. The apparatus of claim 1, wherein the first and second periods are repeated at a predetermined interval.

13. The apparatus of claim 12, wherein the predetermined interval is within a range of 10 to 20 milliseconds.

14. The apparatus of claim 1, wherein the at least one processor is configured
to send a beacon with the first and second periods for the first and second stations.

15. The apparatus of claim 1, wherein the at least one processor is configured
to send a multi poll frame with the first and second periods for the first and second stations.

16. The apparatus of claim 1, wherein the first period is fixed for duration of a first call for the first station, and wherein the second period is fixed for duration of a second call for the second station.

17. The apparatus of claim 1, wherein the at least one processor is configured
to set a transmission opportunity (TXOP) limit of one data frame per channel access for stations in an access class.

18. The apparatus of claim 1, wherein the first and second stations are terminals in a IEEE 802.11 wireless local area network (WLAN).

19. The apparatus of claim 1, wherein the first and second periods are for transmission of data for voice over Internet Protocol (VoIP).

20. A method comprising:
scheduling a first station for a first period having a first duration, a first start time, and a first end time;
scheduling a second station for a second period having a second duration and a second start time that is prior to the first end time;
sending a first transmission to the first station during the first period;
sending prior to the first end time an indication of completion of the first transmission; and
sending a second transmission to the second station during the second period and prior to the first end time.

21. The method of claim 20, wherein the first period comprises a first part for initial transmission for the first station and a second part for additional transmission or retransmission for the first station, and wherein the second start time is at the end of the first part.

22. The method of claim 20, further comprising:
sending signaling for the first and second periods to the first and second stations.

23. An apparatus comprising:
means for scheduling a first station for a first period having a first duration, a first start time, and a first end time;
means for scheduling a second station for a second period having a second duration and a second start time that is prior to the first end time;
means for sending a first transmission to the first station during the first period;
means for sending prior to the first end time an indication of completion of the first transmission; and
means for sending a second transmission to the second station during the second period and prior to the first end time.

24. The apparatus of claim 23, further comprising:
means for sending signaling for the first and second periods to the first and second stations.

25. A processor readable media for storing instructions operable in an apparatus to:
schedule a first station for a first period having a first duration, a first start time, and a first end time;
schedule a second station for a second period having a second duration and a second start time that is prior to the first end time;
send a first transmission to the first station during the first period;
send prior to the first end time an indication of completion of the first transmission; and
send a second transmission to the second station during the second period and prior to the first end time.

26. The processor readable media of claim 25, and further for storing instructions operable to:
send signaling for the first and second periods to the first and second stations.

27. An apparatus comprising:
at least one processor configured
to schedule at least two stations with a particular traffic type in an overall service period, and
to serve each of the at least two stations in a respective one of at least two service periods within the overall service period, wherein the at least two service periods start at beginning of the overall service period; and
a memory coupled to the at least one processor.

28. The apparatus of claim 27, wherein to serve a station the at least one processor is configured
to send at least one frame to the station,
to receive at least one frame from the station, and
to send an indication of completion of the service period to the station.

29. The apparatus of claim 27, wherein the at least two service periods start at different times.

30. The apparatus of claim 27, wherein the at least two service periods end at different times.

31. The apparatus of claim 27, wherein the at least one processor is configured
to send signaling for the at least two service periods to the at least two stations.

32. The apparatus of claim 27, wherein the at least one processor is configured
to send a multi poll frame with the at least two service periods to the at least two stations.

33. The apparatus of claim 27, wherein the at least one processor is configured
to send a beacon with the at least two service periods.

34. The apparatus of claim 27, wherein the at least one processor is configured to schedule the at least two stations in an order determined based on available power, link quality, amount of data to exchange, or a combination thereof.

35. The apparatus of claim 27, wherein the at least one processor is configured
to determine a duration of the service period for each station based on estimates of a rate supported by the station and an amount of data to exchange with the station.

36. The apparatus of claim 27, wherein the overall service period is repeated at a predetermined interval.

37. The apparatus of claim 27, wherein the particular traffic type is voice over Internet Protocol (VoIP).

38. A method comprising:
scheduling at least two stations with a particular traffic type in an overall service period; and
serving each of the at least two stations in a respective one of at least two service periods within the overall service period, wherein the at least two service periods start at beginning of the overall service period and the serving each of the at least two stations comprises:
sending at least one frame to the station,
receiving at least one frame from the station, and
sending an indication of completion of the service period to the station.

39. The method of claim 38, further comprising:
sending signaling for the at least two service periods to the at least two stations.

40. An apparatus comprising:
means for scheduling at least two stations with a particular traffic type in an overall service period; and
means for serving each of the at least two stations in a respective one of at least two service periods within the overall service period, wherein the at least two service periods start at beginning of the overall service period.

41. The apparatus of claim 40, wherein the means for serving each of the at least two stations comprises
means for sending at least one frame to the station,
means for receiving at least one frame from the station, and
means for sending an indication of completion of the service period to the station.

42. The apparatus of claim 40, further comprising:
means for sending signaling for the at least two service periods to the at least two stations.

43. A processor readable media for storing instructions operable to instruct a processor to:
schedule at least two stations with a particular traffic type in an overall service period; and
serve each of the at least two stations in a respective one of at least two service periods within the overall service period, wherein the at least two service periods start at beginning of the overall service period.

44. The processor readable media of claim 43, and further for storing instructions operable to:
send at least one frame to the station,
receive at least one frame from the station, and
send an indication of completion of the service period to the station.

45. The processor readable media of claim 43, and further for storing instructions operable to:
send signaling for the at least two service periods to the at least two stations.

* * * * *